United States Patent
Nilsson et al.

(10) Patent No.: US 12,519,593 B2
(45) Date of Patent: Jan. 6, 2026

(54) SIGNALING FOR TIME BUNDLING OF SOUNDING REFERENCE SIGNAL (SRS) TRANSMISSIONS

(71) Applicant: Telefonaktiebolaget LM Ericsson (publ), Stockholm (SE)

(72) Inventors: Andreas Nilsson, Gothenburg (SE); Mattias Frenne, Uppsala (SE); Sven Jacobsson, Västra Frölunda (SE); Sven Petersson, Sävedalen (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 342 days.

(21) Appl. No.: 17/923,967

(22) PCT Filed: May 14, 2021

(86) PCT No.: PCT/IB2021/054170
§ 371 (c)(1),
(2) Date: Nov. 8, 2022

(87) PCT Pub. No.: WO2021/229539
PCT Pub. Date: Nov. 18, 2021

(65) Prior Publication Data
US 2023/0179368 A1  Jun. 8, 2023

Related U.S. Application Data

(60) Provisional application No. 63/025,494, filed on May 15, 2020, provisional application No. 63/024,866, filed on May 14, 2020.

(51) Int. Cl.
*H04L 5/00* (2006.01)
*H04L 25/02* (2006.01)
(Continued)

(52) U.S. Cl.
CPC ........ *H04L 5/0051* (2013.01); *H04L 25/0204* (2013.01); *H04W 8/22* (2013.01); *H04W 16/28* (2013.01)

(58) Field of Classification Search
CPC .................................................. H04L 5/0051
See application file for complete search history.

(56) References Cited

U.S. PATENT DOCUMENTS

2019/0364517 A1* 11/2019 Gaal ..................... H04W 76/16
2020/0336281 A1* 10/2020 Xirouchakis ........... H04L 7/007
(Continued)

OTHER PUBLICATIONS

International Search Report and Written Opinion dated Jul. 6, 2021 for International Application No. PCT/IB2021/054170 filed May 14, 2021, consisting of 12-pages.
(Continued)

*Primary Examiner* — Jason E Mattis
(74) *Attorney, Agent, or Firm* — Weisberg I.P. Law, P.A.

(57) ABSTRACT

A method, system and apparatus are disclosed. According to one or more embodiments, a network node configured to communicate with a wireless device is provided. The network node includes processing circuitry configured to receive an indication of a wireless device capability to maintain phase coherence within a predefined tolerance for reference signals transmitted by the wireless device in different time slots, receive a first reference signal transmission in a first time slot and a second reference signal transmission in a second time slot where the first reference signal transmission is an aperiodic, AP, reference signal transmission, and perform channel estimation at least in part by combining the first reference signal transmission and the second reference signal transmission.

20 Claims, 14 Drawing Sheets

(51) Int. Cl.
  *H04W 8/22* (2009.01)
  *H04W 16/28* (2009.01)

(56) References Cited

U.S. PATENT DOCUMENTS

| | | | | |
|---|---|---|---|---|
| 2022/0393744 | A1* | 12/2022 | Karjalainen | H04B 7/0697 |
| 2023/0009319 | A1* | 1/2023 | Manolakos | H04L 27/261 |
| 2023/0045308 | A1* | 2/2023 | Guan | H04L 5/0051 |
| 2023/0054832 | A1* | 2/2023 | Wang | H04L 5/0053 |

OTHER PUBLICATIONS

3GPP TSG-RAN WG1 #91 R1-1720716; Title: Codebook based transmission with multiple SRI; Agenda Item: 7.2.1.5; Source: Ericsson; Document for: Discussion and Decision; Date and Location: Nov. 27-Dec. 1, 2017, Reno, USA, consisting of 6-pages.

3GPP TSG-RAN Meeting #84 RP-191049; Further Enhancements on MIMO for NR; Agenda Item: 8; Ericsson; Jun. 3-6, 2019, Newport Beach, CA, USA, consisting of 7pages.

3GPP TSG-RAN WG1 Meeting #100bis R1-2002368; Title: Corrections for Full Power UL Transmission; Agenda Item: 7.2.6.4; Source: Ericsson; Document for: Discussion and Decision; Date and Location: Apr. 20-30, 2020, e-Meeting, consisting of 11-pages.

ETSI TS 138 211 V15.8.0; Technical Specification; 5G;NR; Physical channels and modulation (3GPP TS 38.211 version 15.8.0 Release 15); Jan. 2020, consisting of 100-pages.

ETSI TS 138 213 V15.3.0; Technical Specification; 5G;NR; Physical layer procedures for control (3GPP TS 38.213 version 15.3.0 Release 15); Oct. 2018, consisting of 102-pages.

ETSI TS 138 214 V15.3.0; Technical Specification; 5G;NR; Physical layer procedures for data (3GPP TS 38.214 version 15.3.0 Release 15); Oct. 2018, consisting of 99-pages.

ETSI TS 138 331 V15.8.0; Technical Specification; 5G;NR; Radio Resource Control (RRC); Protocol Specification 3GPP TS 38.331 version 15.8.0 Release 15); Jan. 2020, consisting of 527-pages.

* cited by examiner

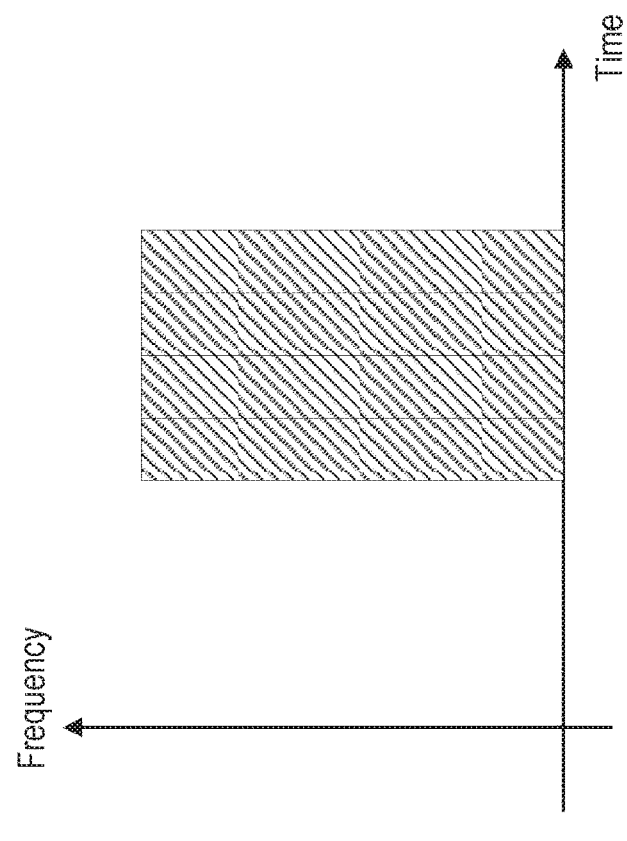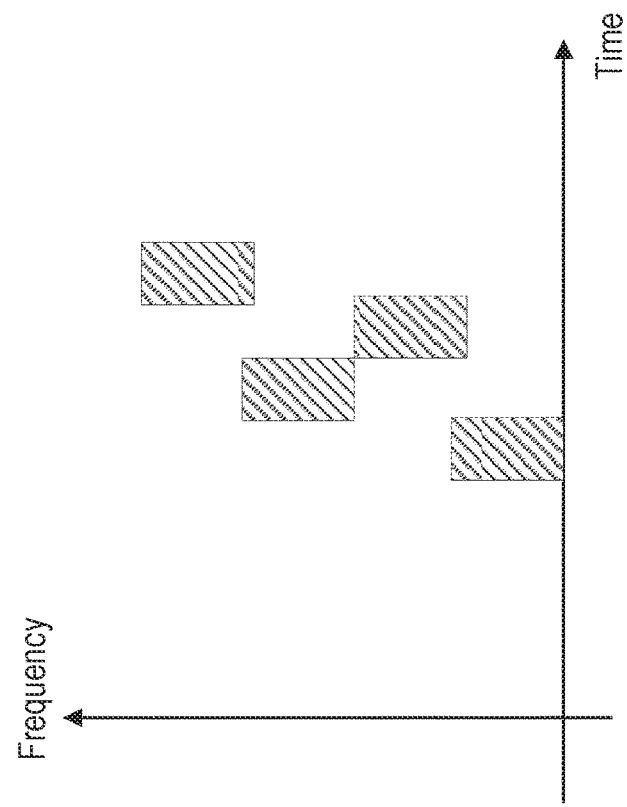
FIG. 2

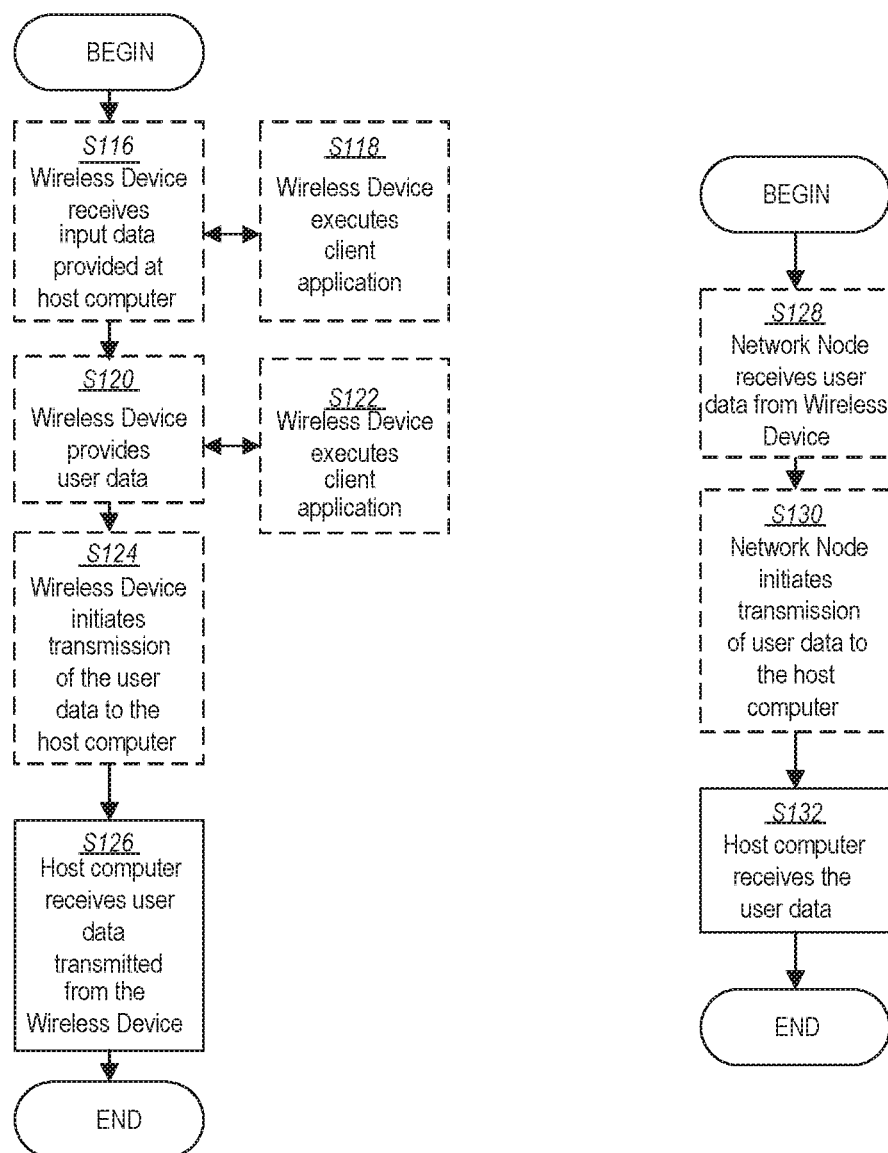

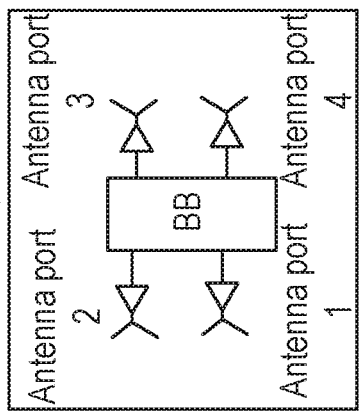

FIG. 16

WD 22 with four antenna ports and one baseband (BB) chain per port

AP SRS resource set 1:
- Time-domain behavior
  - Aperiodic
- SRS resource 1
  - SRS port 1
  - SRS port 2
  - SRS port 3
  - SRS port 4

SRS resource set 2:
- Time-domain behavior
  - Aperiodic
- SRS resource 2
  - SRS port 1
  - SRS port 2
- SRS resource 3
  - SRS port 1
  - SRS port 2

AP SRS resource set 1 mapping:
- Antenna port 1 <-> SRS port 1
- Antenna port 2 <-> SRS port 2
- Antenna port 3 <-> SRS port 3
- Antenna port 4 <-> SRS port 4

AP SRS resource set 2 mapping:
- Antenna port 1 <-> SRS resource 2, SRS port 1
- Antenna port 2 <-> SRS resource 2, SRS port 2
- Antenna port 3 <-> SRS resource 3, SRS port 1
- Antenna port 4 <-> SRS resource 3, SRS port 2

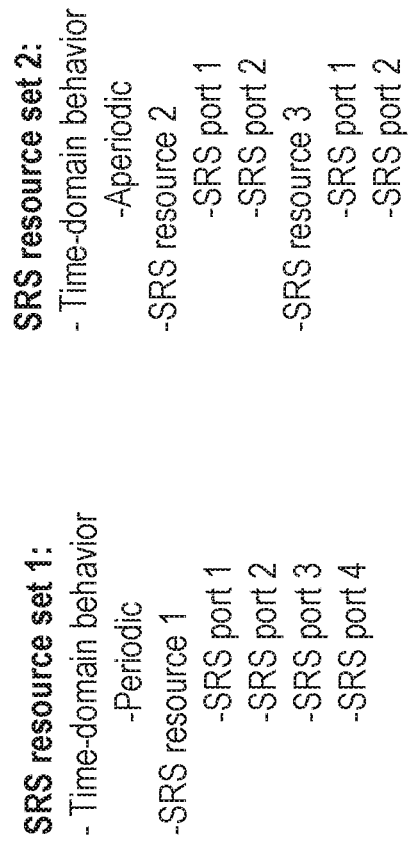
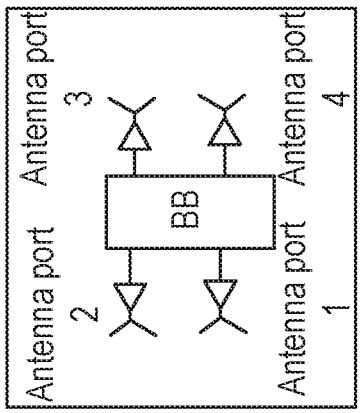
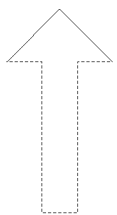
FIG. 17

SIGNALING FOR TIME BUNDLING OF SOUNDING REFERENCE SIGNAL (SRS) TRANSMISSIONS

CROSS-REFERENCE TO RELATED APPLICATIONS

This application is a Submission Under 35 U.S.C. § 371 for U.S. National Stage Patent Application of International Application No.: PCT/IB2021/054170, filed May 14, 2021 entitled "SIGNALING FOR TIME BUNDLING OF SOUNDING REFERENCE SIGNAL (SRS) TRANSMISSIONS," which claims priority to U.S. Provisional Application No. 63/025,494, filed May 15, 2020, entitled "SIGNALING FOR TIME BUNDLING BETWEEN P/SP AND AP SRS," and U.S. Provisional Application No. 63/024,866, filed May 14, 2020, entitled "SIGNALING FOR TIME BUNDLING BETWEEN AP AND AP SRS," the entireties of all of which are incorporated herein by reference.

TECHNICAL FIELD

The present disclosure relates to wireless communications, and in particular, to time bundling of different AP SRS transmissions for channel estimation and cross-time coherence using different resource type reference signal transmissions.

BACKGROUND

The sounding reference signal (SRS) is used in Third Generation Partnership Project (3GPP) systems such as Long Term Evolution (LTE) and New Radio (NR) (also known as 5G) to estimate the channel in the uplink (UL). The application for the SRS is mainly to provide a pilot signal to evaluate the channel quality in order to, e.g., derive the appropriate transmission/reception beams or to perform link adaptation (i.e., setting the modulation and coding scheme (MCS) and the multiple-input multiple-output (MIMO) precoder) for physical uplink shared channel (PUSCH) transmission. The SRS is functionality similar to the downlink (DL) channel-state information reference signal (CSI-RS), which provide similar beam management and link adaptation functions in the DL.

In LTE and NR, the SRS signal is configured via radio resource control (RRC), and some parts of the configuration can be updated by medium access control (MAC) control element (CE) signaling (to avoid using RRC which is slower than MAC CE). The configuration includes the SRS resource allocation (the physical resource and sequences to use) as well as the aperiodic/periodic/semi-persistent behavior. For aperiodic SRS transmission, the RRC configuration does not activate an SRS transmission from the wireless device, but instead a dynamic activation trigger is transmitted via the physical downlink control channel (PDCCH)'s downlink control information (DCI) in the DL from the network node to order the wireless device to transmit the SRS once, at a predetermined time.

SRS Configuration

The SRS configuration allows for the generation of an SRS transmission pattern based on an SRS resource configuration grouped into SRS resource sets. Each SRS resource is configured with the following abstract syntax notation (ASN) code in RRC as described in wireless communication standards such as 3GPP Technical Specification (TS) 38.331 version 15.8, and as illustrated below:

```
SRS-Resource ::=                    SEQUENCE {
    srs-ResourceId                      SRS-ResourceId,
    nrofSRS-Ports                       ENUMERATED {port1, ports2, ports4},
    ptrs-PortIndex                      ENUMERATED {n0, n1 }
OPTIONAL, -- Need R
    transmissionComb                        CHOICE {
        n2                              SEQUENCE {
            combOffset-n2                       INTEGER (0..1),
            cyclicShift-n2                      INTEGER (0..7),
        },
        n4                              SEQUENCE {
            combOffset-n4                       INTEGER (0..3),
            cyclicShift-n4                      INTEGER (0..11),
        }
    },
    resourceMapping                     SEQUENCE {
        startPosition                       INTEGER (0..5),
        nrofSymbols                         ENUMERATED {n1, n2, n4},
        repetitionFactor                    ENUMERATED {n1, n2, n4}
    },
    freqDomainPosition                      INTEGER (0..67),
    freqDomainShift                         INTEGER (0..268),
    freqHopping                         SEQUENCE {
        c-SRS                               INTEGER (0..63),
        b-SRS                               INTEGER (0..3),
        b-hop                           INTEGER (0..3),
    },
    groupOrSequenceHopping                      ENUMERATED { neither, groupHopping,
sequenceHopping },
    resource Type                       CHOICE {
        aperiodic                       SEQUENCE {
        ...
        },
        semi-persistent                 SEQUENCE {
            periodicity AndOffset-sp            SRS-Periodicity AndOffset,
        ...
        },
        periodic                        SEQUENCE {
```

```
        periodicity AndOffset-p                SRS-Periodicity AndOffset,
        ...
      }
    },
    sequenceId                    INTEGER (0..1023),
    spatialRelationInfo                SRS-SpatialRelationInfo
    OPTIONAL, -- Need R
    ...
}
```

To create the SRS resource on the time-frequency grid with the current RRC configuration, each SRS resource is thus configurable with respect to:

- The transmission comb (i.e., mapping to every $n^{th}$ subcarrier, where n=2 or n=4), configured by the RRC parameter transmissionComb.
  - For each SRS resource, a comb offset, configured by the RRC parameter combOffset, is specified (i.e., which of the n combs to use).
  - A cyclic shift, configured by the RRC parameter cyclicShift, of the SRS sequence that maps to the assigned comb is also specified. The cyclic shift increases the number of SRS resources that can be mapped to a comb, but there may be a limit on how many cyclic shifts that can be used that depends on the transmission comb being used.
- The time-domain position of an SRS resource within a given slot is configured with the RRC parameter resourceMapping.
  - A time-domain start position for the SRS resource, which is limited to be one of the last 6 symbols in a slot, is configured by the RRC parameter startPosition.
  - A number of orthogonal frequency-division multiplexing (OFDM) symbols for the SRS resource (that can be set to 1, 2 or 4) is configured by the RRC parameter nrofSymbols.
  - A repetition factor (that can be set to 1, 2 or 4) configured by the RRC parameter repetitionFactor. When this parameter is larger than 1, the same frequency resources are used multiple times across OFDM symbols, to improve the coverage as more energy is collected by the receiver. It can also be used for beam-management functionality, where the network node can probe different receive beams for each repetition.
- The frequency-domain sounding bandwidth and position of an SRS resource in a given OFDM symbol (i.e., which part of the system bandwidth is occupied by the SRS resource) is configured with the RRC parameters freqDomainPosition, freqDomainShift and the freqHopping parameters: c-SRS, b-SRS and b-hop. The smallest possible sounding bandwidth in a given OFDM symbol may be 4 resource blocks (RBs).

An example of a schematic description of how an SRS resource may be allocated in time and frequency in a given OFDM symbol within a slot is provided in FIG. 1. In particular, c-SRS controls the maximum sounding bandwidth, which can be smaller than the maximum transmission bandwidth the wireless device supports. For example, the wireless device may have capability to transmit over 40 MHz bandwidth, but c-SRS is set to a smaller value corresponding to 5 MHz, thereby focusing the available transmit power to a narrowband transmission which improves the SRS coverage.

Since the frequency-domain sounding bandwidth of an SRS resource set is configured using RRC signaling, it is cumbersome to change the frequency-domain sounding bandwidth of an SRS resource set. With existing standards, it is however possible to configure a wireless device with multiple SRS resource sets where the different SRS resource sets are configured with different frequency-domain sounding bandwidths. The network node can then trigger transmission of a specific SRS resource set depending on the desired frequency-domain sounding bandwidth. However, since there are strict limits of the number of configurable SRS resource sets for each usage, the potential for this solution is very limited. For example, a maximum of one SRS resource set with usage 'codebook' or 'nonCodebook' is allowed, a maximum two SRS resource sets with usage 'antennaSwitching' is allowed, and SRS resource set with usage 'beamManagement' is only mandatory for wireless devices not supporting beam correspondence and is only applicable for FR2 frequencies.

The RRC parameter resourceType configures whether the resource is transmitted as periodic, aperiodic (singe transmission triggered by DCI), or semi persistent (same as periodic but the start and stop of the periodic transmission is controlled by MAC CE signaling instead of RRC signaling). The RRC parameter sequenceId specifies how the SRS sequence is initialized and the RRC parameter spatialRelationInfo configures the spatial relation for the SRS beam with respect to a reference signal (RS) which can be either another SRS, synchronization signal block (SSB) or CSI-RS. Hence, if the SRS has a spatial relation to another SRS, then this SRS should be transmitted with the same beam (i.e., spatial transmit filter) as the indicated SRS.

The SRS resource may be configured as part of an SRS resource set. Within a SRS resource set, the following parameters (common to all resources in the set) may be configured in RRC:

- The associated CSI-RS resource (this configuration is only applicable for non-codebook-based UL transmission) for each of the possible resource types (aperiodic, periodic and semi persistent). For aperiodic SRS, the associated CSI-RS resource is set by the RRC parameter csi-RS. For periodic and semi-persistent SRS, the associated CSI-RS resource is set by the RRC parameter associatedCSI-RS. Note that all resources in a resource set must share the same resource type.
- For aperiodic resources, the slot offset is configured by the RRC parameter slotOffset and sets the delay from the PDCCH trigger reception to start the transmission of the SRS resources measured in slots.
- The resource usage, which is configured by the RRC parameter usage sets the constrains and assumption on the resource properties as described in wireless communication standards such as 3GPP TS 38.214.
- The power-control RRC parameters alpha, p0 pathlossReferenceRS (indicating the downlink RS that can be used for path loss estimation) and srs-PowerControlAdjustmentStates, may be used to determine the SRS transmit power.

Each SRS resource set is configured with the following ASN code in RRC as described in wireless communication standards such as 3GPP TS 38.331 version 15.8, and as illustrated below:

device transmit beam. The network node can then inform the wireless device which transmit beam to use by updating the spatial relation for different UL RSs, for more info about spatial relations. The network node may configure the wireless device with one SRS resource set with usage 'beamManagement' for each analog array (panel) that the wireless

```
SRS-ResourceSet ::=                        SEQUENCE {
    srs-ResourceSetId                          SRS-ResourceSetId,
    srs-ResourceIdList                         SEQUENCE (SIZE(1..maxNrofSRS-
ResourcesPerSet)) OF SRS-ResourceId            OPTIONAL, -- Cond Setup
    resourceType                               CHOICE {
        aperiodic                              SEQUENCE {
            aperiodicSRS-ResourceTrigger               INTEGER (1..maxNrofSRS-
TriggerStates-1),
            csi-RS                                 NSP-CSI-RS-ResourceId
OPTIONAL, -- Cond NonCodebook
            slotOffset                             INTEGER (1..32)
OPTIONAL, -- Need S
            ...,
            [[
            aperiodicSRS-ResourceTriggerList-v1530     SEQUENCE
(SIZE(1..maxNrofSRS-TriggerStates-2))
                                                   OF INTEGER (1..maxNrofSRS-TriggerStates-
1) OPTIONAL -- Need M
            ]]
        },
        semi-persistent                        SEQUENCE {
            associatedCSI-RS                       NZP-CSI-RS-ResourceId
OPTIONAL, -- Cond NonCodebook
            ...
        },
        periodic                               SEQUENCE {
            associatedCSI-RS                       NZP-CSI-RS-ResourceId
OPTIONAL, -- Cond NonCodebook
            ...
        }
    },
    usage                                      ENUMERATED {beamManagement, codebook,
nonCodebook, antennaSwitching},
    alpha                                      Alpha                               OPTIONAL, --
Need S
    p0                                         INTEGER (-202..24)
OPTIONAL, -- Cond Setup
    pathlossReferenceRS                            CHOICE {
        ssb-Index                                  SSB-Index,
        csi-RS-Index                               NZP-CSI-RS-ResourceId
    }                                                                              OPTIONAL, --
Need M
    srs-PowerControlAdjustmentStates               ENUMERATED { sameAsFci2,
separateClosedLoop}                        OPTIONAL, -- Need S
    ...
}
```

Hence, in terms of resource allocation, the resource set configures resource usage, power control, aperiodic transmission timing, and DL resource association. The resource configuration controls the time-and-frequency allocation, the periodicity and offset of each resource, the sequence ID for each resource and the spatial relation information.
Resource Mapping to Antenna Ports In some embodiments, SRS resources can be configured with four different usages: 'beamManagement', 'codebook', 'nonCodebook' or 'antennaSwitching'.

SRS resources in an SRS resource set configured with usage 'beamManagement' are mainly applicable for frequency bands above 6 GHz (i.e., for frequency range 2 (FR2)) and the purpose is to allow the wireless device to evaluate different wireless device transmit beams for wideband (e.g., analog) beamforming arrays. The wireless device may then transmit one SRS resource per wideband beam, and the network node may perform reference signal received power (RSRP) measurement on each of the transmitted SRS resources and in this way determine a suitable wireless device has. In NR 3GPP Release 15, it is up to wireless device implementation as to how to associate the SRS resource set with usage 'beamManagement' to the different wireless device panels, however it is discussed in 3GPP to have a fixed mapping between a certain wireless device panel and a certain SRS resource set, so that the network node can get more control of how the wireless device uses the different wireless device panels. Also, each SRS resource in the set may contain either one or two SRS ports depending on if the analog panel has one or two polarizations.

SRS resources in an SRS resource set configured with usage 'codebook' are used to sound the different wireless device antennas and to let the network node determine suitable precoders, rank and MCS for an upcoming uplink (UL) transmission from the wireless device. How each SRS port is mapped to each wireless device antenna is up to the wireless device implementation, but one SRS port may be transmitted per wireless device antenna, i.e., the SRS port to antenna-port mapping may be an identity matrix.

SRS resources in an SRS resource set configured with usage 'nonCodebook' are used to sound different potential precoders, autonomously determined by the wireless device. The wireless device may determine a set of candidate precoders based on reciprocity, transmit one SRS resource per candidate precoder, and the network node can then select which precoders the wireless device should use for upcoming PUSCH transmissions. One uplink (UL) layer may be transmitted per indicated candidate precoder. How the wireless device maps the SRS resources to the antenna ports is determined by wireless device implementation and may depend on the channel realization.

SRS resources in an SRS resource set configured with usage 'antennaSwitching' are used to sound the channel in the UL so that the network node can use reciprocity to determine suitable DL precoders. If the wireless device has the same number of transmit and receive chains, the wireless device is expected to transmit one SRS port per wireless device 22 antenna. The mapping from SRS ports to antenna ports is, however, for the wireless device to decide and is transparent to the network node.

In NR 3GPP Release 16, a new usage for SRS, 'positioning', was agreed to for handling the case of SRS used for positioning. Within this usage, an SRS resource may be configured with a comb-based pattern that is more flexible than the one available in NR 3GPP Release 15. One limitation with the positioning SRS is that only single-port transmission is supported, which means that each triggered SRS set can only be used to sound one single wireless device antenna SRS Coverage Uplink coverage for SRS is identified as a bottleneck for NR 3GPP standards and a limiting factor for DL reciprocity-based operation. Some measures to improve the coverage of SRS have been adopted in NR 3GPP. For example, repetition of an SRS resource and/or frequency hopping has been adopted. One example of frequency hopping is illustrated in the left part of FIG. 2, where different parts of the frequency band are sounded in different OFDM symbols, which means that the power spectral density (PSD) for the SRS transmission may improve. Here, the illustrated frequency-hopping pattern is set according to existing wireless communication standards such as Section 6.4.1.4.3 of 3GPP TS 38.211 version 15.8. The right part of FIG. 2 illustrates an example of repetition, where one SRS resource is transmitted in four consecutive OFDM symbols, which will increase the processing gain of the SRS as, for example, the same SRS transmission is repeated.

SRS Power Scaling

SRS has its own UL power control (PC) scheme in NR 3GPP, which can be found in existing wireless communication standards such as in Section 7.3 in 3GPP TS 38.213. The SRS output power ($P_{SRS}$) the wireless device should use for a given SRS transmission is given by the formula:

$$P_{SRS,b,f,c}(i, q_s, l) = \min\begin{cases}P_{CMAX,f,c}(i), \\ P_{O,SRS,b,f,c}(q_s) + 10\log_{10}(2^\mu \cdot M_{SRS,b,f,c}(i)) + \alpha_{SRS,b,f,c}(q_s) \cdot PL_{b,f,c}(q_s) + h_{b,f,c}(i, l)\end{cases}$$

Some existing wireless communication standards such as Section 7.3 in 3GPP TS 38.213 additionally specifies how the wireless device should split the above output power, $P_{SRS}$, between two-or-more different SRS ports transmitted during one SRS transmit occasion. An SRS transmit occasion is a time window within a slot where SRS transmission is performed: For SRS, a wireless device splits a linear value $P_{SRS,b,f,c}(i, q_s, l)$ of the transmit power $P_{SRS,b,f,c}(i, q_s, l)$ on active UL BWP b of carrier f of serving cell c equally across the configured antenna ports for SRS.

However, existing wireless communication systems fail to consider how different SRS transmissions can be adapted for SRS channel estimation without introducing excessive overhead.

Also, there is a tradeoff between coverage of SRS resources and the amount of time/frequency resources that are used for the SRS transmission. For example, the more repetitions of an SRS resource in a slot (in NR 3GPP Release 16, up to 4 repetitions are possible), the better the coverage but at the cost of more time/frequency resources. Also, performing additional repetition in a slot consumes more SRS symbols that may block or use up resources that could have been used for data and/or control transmissions in that slot.

For periodic (P) and semi-persistent (SP) SRS resources, where the time/frequency resources for the SRS may be used frequently (in a periodic manner), trying to minimize time/frequency resource consumption for each SRS resource may be important. However, in the case of no repetition and/or frequency hopping for the SRS, if the wireless device comes into a fading dip or for other reason experiences a drop in link budget such that, for example, the communication link degrades, the SRS coverage of the P/SP SRS might become poor, resulting in reduced user performance.

To increase the coverage for P/SP SRS with periodicity T [ms], time bundling has been proposed for NR 3GPP Release 17. With time bundling for a P/SP SRS resource set, SRS resources in two (or more) different slots are combined in order to improve the quality of the CSI at the network node. If the channel is not (significantly) time varying over the period T, time bundling is expected to give some coverage enhancement for P/SP SRS. However, the value of T typically has to be small to ensure that the channel conditions remain fairly or somewhat constant over the time bundled SRS transmissions, which results in a large overhead as SRS transmissions blocks or uses time/frequency resources which otherwise could have been used for data and/or control transmissions.

To change the SRS configuration for P/SP SRS resources is a cumbersome and slow process as existing systems use RRC signaling for configuration/re-configuration of SRS. Hence, it might not be possible to adapt the SRS configuration sufficiently fast to follow rapid variations in the channel conditions for a wireless device (due to, e.g., a wireless device changing its speed).

SUMMARY

Some embodiments advantageously provide methods, systems, and apparatuses for time bundling of different AP SRS transmissions for channel estimation and for cross-time coherence using different resource type reference signal transmissions.

Time bundling across different AP SRS transmissions is provided with embodiments related to one or more of power control, the number of ports, explicit and implicit mechanisms for dynamic indication (enabled/disabled) of time bundling across AP SRS resources. In particular, the teachings described herein provide for time bundling between two different AP SRS transmissions such as to allow the network node to adapt the SRS channel estimation quality as needed without introducing excessive overhead.

Also, Time bundling across P/SP and aperiodic (AP) SRS transmissions is provided with embodiments related to power control, the number of ports, and explicit and implicit mechanisms for dynamic enabling/disabling of time bundling across P/SP and AP.

Enabling time bundling between P/SP and AP SRS transmissions allows the network node to adapt the SRS channel estimation quality at the network node to the current need and/or current communication link budget without introducing excessive overhead.

According to one aspect of the disclosure, a network node configured to communicate with a wireless device is provided. The network node includes processing circuitry configured to receive an indication of a wireless device capability to maintain phase coherence within a predefined tolerance for reference signals transmitted by the wireless device in different time slots, receive a first reference signal transmission in a first time slot and a second reference signal transmission in a second time slot where the first reference signal transmission is an aperiodic, AP, reference signal transmission, and perform channel estimation at least in part by combining the first reference signal transmission and the second reference signal transmission.

According to one or more embodiments of this aspect, the second reference signal transmission is one of an AP reference signal transmission, a periodic reference signal transmission, and a semi-persistent reference signal transmission. According to one or more embodiments of this aspect, the second reference signal transmission is the AP reference signal transmission. According to one or more embodiments of this aspect, the processing circuitry is further configured to: determine whether at least one of a physical shared channel transmission and physical control channel transmission occurred during a time duration between the first reference signal transmission and the second reference signal transmission where the combining of the first reference signal transmission and the second reference signal transmission is based at least on the determination that the physical shared channel transmission and physical control channel transmission did not occur during the time duration.

According to one or more embodiments of this aspect, the processing circuitry is further configured to determine a first spatial relation of a first reference signal resource set associated with the first reference signal transmission, determine a second spatial relation of a second reference signal resource set associated with the second reference signal transmission, and determine whether the first spatial relation is the same as the second spatial relation. The combining of the first reference signal transmission and the second reference signal transmission is based at least on the determination that the first spatial relation is the same as the second spatial relation. According to one or more embodiments of this aspect, the first reference signal transmission and the second reference signal transmission are associated with a same SRS trigger state. According to one or more embodiments of this aspect, the second reference signal transmission is one of a periodic reference signal transmission and a semi-persistent reference signal transmission.

According to one or more embodiments of this aspect, the processing circuitry is further configured to determine whether a time separation between the first reference signal transmission and the second reference signal transmission meets a predefined time duration threshold. The combining of the first reference signal transmission and the second reference signal transmission is based at least on the determined time separation not meeting the predefined time duration threshold. According to one or more embodiments of this aspect, the processing circuitry is further configured to cause transmission of an indication that indicates for the wireless device to use a cross-time coherence operation to maintain phase coherence within the predefined tolerance for reference signals transmitted in different time slots. According to one or more embodiments of this aspect, the indication is provided using one of downlink control information, DCI, signaling and radio resource control, RRC, signaling. According to one or more embodiments of this aspect, a DCI format of the DCI indicates SRS resources and a portion of a frequency band for transmitting the first reference signal transmission.

According to another aspect of the disclosure, a wireless device configured to communicate with a network node is provided. The wireless device includes processing circuitry configured to cause transmission of an indication of a capability to maintain phase coherence within a predefined tolerance for reference signals transmitted by the wireless device in different time slots, and cause transmission of a first reference signal transmission in a first time slot and a second reference signal transmission in a second time slot where the first reference signal transmission is an aperiodic, AP, reference signal transmission and has a phase coherence within the predefined tolerance of the second reference signal transmission for channel estimation at least in part by combining the first reference signal transmission and the second reference signal transmission.

According to one or more embodiments of this aspect, the second reference signal transmission is one of: an AP reference signal transmission, a periodic reference signal transmission, and a semi-persistent reference signal transmission. According to one or more embodiments of this aspect, the second reference signal transmission is the AP reference signal transmission. According to one or more embodiments of this aspect, the combining of the first reference signal transmission and the second reference signal transmission is based at least on a physical shared channel transmission and physical control channel transmission not occurring during a time duration between the first reference signal transmission and the second reference signal transmission.

According to one or more embodiments of this aspect, the combining of the first reference signal transmission and the second reference signal transmission is based at least on a first spatial relation of the first reference signal transmission having a same spatial relation as a second spatial relation of the second reference signal transmission. According to one or more embodiments of this aspect, the first reference signal transmission and the second reference signal transmission are associated with a same SRS trigger state. According to one or more embodiments of this aspect, the second reference signal transmission is one of a periodic reference signal transmission and a semi-persistent reference signal transmission.

According to one or more embodiments of this aspect, the combining of the first reference signal transmission and the second reference signal transmission is based at least on a time separation between the first reference signal transmission and the second reference signal transmission not meeting a predefined time duration threshold. According to one or more embodiments of this aspect, the processing circuitry is further configured to receive of an indication that indicates for the wireless device to use a cross-time coherence operation to maintain phase coherence within the predefined tolerance for reference signals transmitted in different time slots. According to one or more embodiments of this aspect, the indication is provided using one of downlink control information, DCI, signaling and radio resource control, RRC, signaling.

According to one or more embodiments of this aspect, a DCI format of the DCI indicates SRS resources and a portion of a frequency band for transmitting the first reference signal transmission. According to one or more embodiments of this aspect, the processing circuitry is further configured to override a configured transmission control parameter to cause transmission of the first reference signal transmission and second reference signal transmission at a same transmission power. According to one or more embodiments of this aspect, the processing circuitry is further configured to apply a same SRS-port-to-antenna-port mapping for both the first and second reference signal transmissions.

According to another aspect of the disclosure, a method implemented by a network node that is configured to communicate with a wireless device is provided. An indication of a wireless device capability to maintain phase coherence within a predefined tolerance for reference signals transmitted by the wireless device in different time slots is received. A first reference signal transmission in a first time slot and a second reference signal transmission in a second time slot is received. The first reference signal transmission is an aperiodic, AP, reference signal transmission. Channel estimation is performed at least in part by combining the first reference signal transmission and the second reference signal transmission.

According to one or more embodiments of this aspect, the second reference signal transmission is one of an AP reference signal transmission, a periodic reference signal transmission, and a semi-persistent reference signal transmission. According to one or more embodiments of this aspect, the second reference signal transmission is the AP reference signal transmission. According to one or more embodiments of this aspect, a determination whether at least one of a physical shared channel transmission and physical control channel transmission occurred during a time duration between the first reference signal transmission and the second reference signal transmission is performed. The combining of the first reference signal transmission and the second reference signal transmission is based at least on the determination that the physical shared channel transmission and physical control channel transmission did not occur during the time duration.

According to one or more embodiments of this aspect, a first spatial relation of a first reference signal resource set associated with the first reference signal transmission is determined. A second spatial relation of a second reference signal resource set associated with the second reference signal transmission is determined. A determination whether the first spatial relation is the same as the second spatial relation is performed. The combining of the first reference signal transmission and the second reference signal transmission is based at least on the determination that the first spatial relation is the same as the second spatial relation. According to one or more embodiments of this aspect, the first reference signal transmission and the second reference signal transmission are associated with a same SRS trigger state. According to one or more embodiments of this aspect, the second reference signal transmission is one of a periodic reference signal transmission and a semi-persistent reference signal transmission. According to one or more embodiments of this aspect, a determination whether a time separation between the first reference signal transmission and the second reference signal transmission meets a predefined time duration threshold is performed. The combining of the first reference signal transmission and the second reference signal transmission is based at least on the determined time separation not meeting the predefined time duration threshold.

According to one or more embodiments of this aspect, transmission is caused of an indication that indicates for the wireless device to use a cross-time coherence operation to maintain phase coherence within the predefined tolerance for reference signals transmitted in different time slots. According to one or more embodiments of this aspect, the indication is provided using one of downlink control information, DCI, signaling and radio resource control, RRC, signaling. According to one or more embodiments of this aspect, a DCI format of the DCI indicates SRS resources and a portion of a frequency band for transmitting the first reference signal transmission.

According to another aspect of the disclosure, a method implemented by a wireless device that is configured to communicate with a network node is provided. An indication of a capability to maintain phase coherence within a predefined tolerance for reference signals transmitted by the wireless device in different time slots is transmitted. A first reference signal transmission in a first time slot and a second reference signal transmission in a second time slot is transmitted where the first reference signal transmission is an aperiodic, AP, reference signal transmission and has a phase coherence within the predefined tolerance of the second reference signal transmission for channel estimation at least in part by combining the first reference signal transmission and the second reference signal transmission.

According to one or more embodiments of this aspect, the second reference signal transmission is one of: an AP reference signal transmission, a periodic reference signal transmission, and a semi-persistent reference signal transmission. According to one or more embodiments of this aspect, the second reference signal transmission is the AP reference signal transmission. According to one or more embodiments of this aspect, the combining of the first reference signal transmission and the second reference signal transmission is based at least on a physical shared channel transmission and physical control channel transmission not occurring during a time duration between the first reference signal transmission and the second reference signal transmission.

According to one or more embodiments of this aspect, the combining of the first reference signal transmission and the second reference signal transmission is based at least on a first spatial relation of the first reference signal transmission having a same spatial relation as a second spatial relation of the second reference signal transmission. According to one or more embodiments of this aspect, the first reference signal transmission and the second reference signal transmission are associated with a same SRS trigger state. According to one or more embodiments of this aspect, the second reference signal transmission is one of a periodic reference signal transmission and a semi-persistent reference signal transmission.

According to one or more embodiments of this aspect, the combining of the first reference signal transmission and the second reference signal transmission is based at least on a time separation between the first reference signal transmission and the second reference signal transmission not meeting a predefined time duration threshold. According to one or more embodiments of this aspect, an indication that indicates for the wireless device to use a cross-time coherence operation to maintain phase coherence within the predefined tolerance for reference signals transmitted in different time slots is received. According to one or more embodiments of this aspect, the indication is provided using one of downlink control information, DCI, signaling and radio resource control, RRC, signaling.

According to one or more embodiments of this aspect, a DCI format of the DCI indicates SRS resources and a portion of a frequency band for transmitting the first reference signal transmission. According to one or more embodiments of this aspect, a configured transmission control parameter is overridden to cause transmission of the first reference signal transmission and second reference signal transmission at a same transmission power. According to one or more embodiments of this aspect, a same SRS-port-to-antenna-port mapping for both the first and second reference signal transmissions is applied.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 2 is a diagram of a comparison between SRS transmission suing frequency hopping and repetition;

FIG. 7 is a flowchart illustrating exemplary methods implemented in a communication system including a host computer, a network node and a wireless device for receiving user data from the wireless device at a host computer according to some embodiments of the present disclosure;

FIG. 8 is a flowchart illustrating exemplary methods implemented in a communication system including a host computer, a network node and a wireless device for receiving user data at a host computer according to some embodiments of the present disclosure;

FIG. 16 is a diagram of SRS port to antenna port mapping according to some embodiments of the present disclosure;

FIG. 17 is a diagram of an example of mapping according to some embodiments of the present disclosure.

DETAILED DESCRIPTION

SRS Time Bundling

Figure 1:
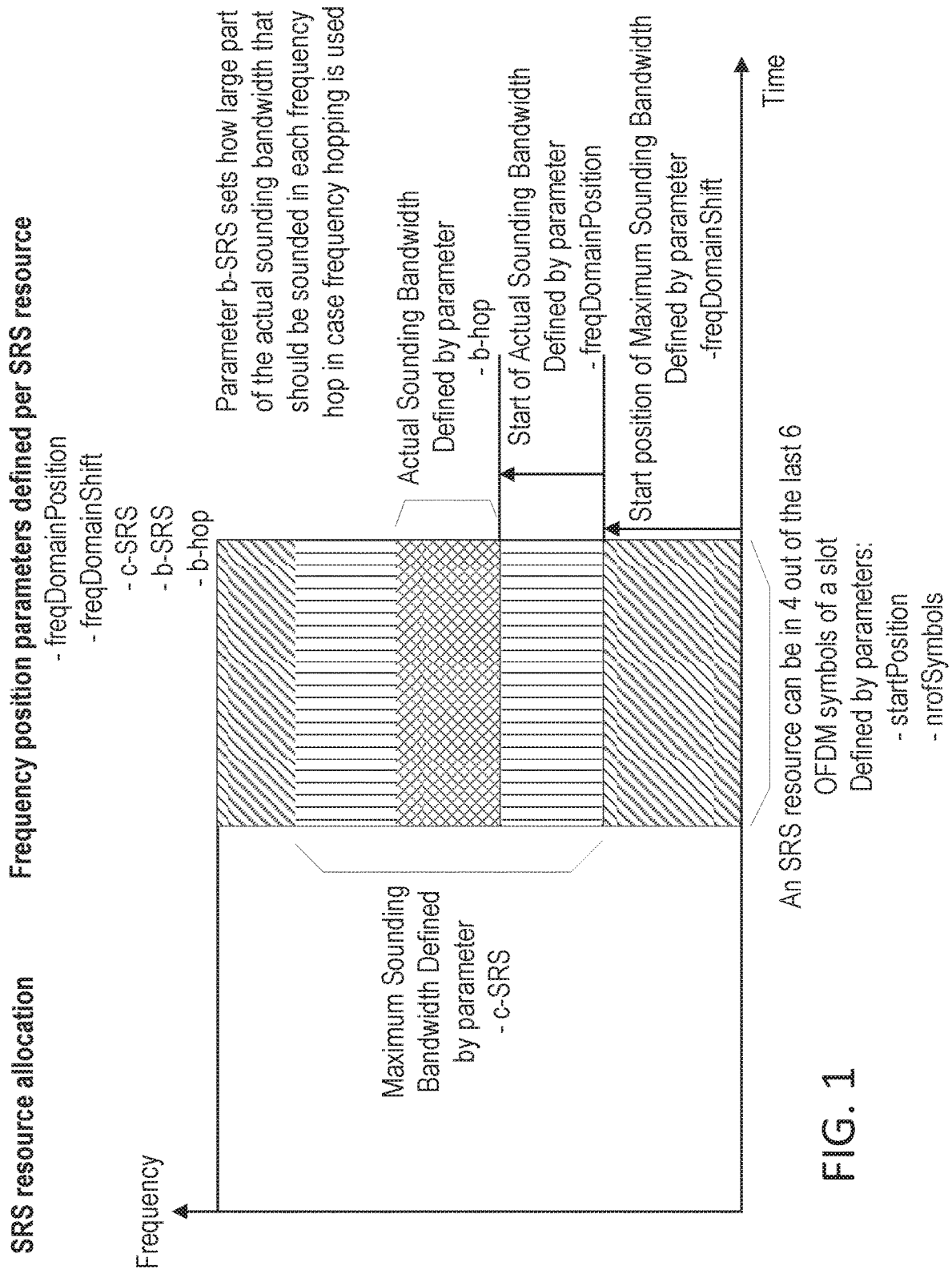
FIG. 1 is a diagram of SRS resource allocation in time and frequency for an SRS resource in a OFDM symbol within a slot.

SRS time bundling refers to arrangements where multiple SRS transmissions are performed by a wireless device at different time slots, and that the receiver (e.g., the network node) can combine the multiple SRS transmissions in different ways in order to improve the quality of the channel state information (CSI) at the network node. The phase (and potentially also the amplitude) of the wireless device transmit chains at the occasions of the different SRS transmissions can experience different levels of coherency (i.e., different levels of phase and amplitude similarity).

Further, different AP SRS transmissions might span different frequency bands (sizes and/or position). To improve the channel estimation, it could be useful to be able to time bundle the different AP SRS transmission to extend the sounded bandwidth (in case the AP SRS transmissions span different parts of the frequency band) and/or by improving the channel estimation for a certain part of the frequency band (in case the frequency bands of the SRS transmissions are overlapping or partly overlapping with each other). However, the existing wireless communication systems fail to provide time bundling of at least two aperiodic (AP) SRS transmissions in a suitable way such as without introducing excessive overhead.

Before describing in detail exemplary embodiments, it is noted that the embodiments reside primarily in combinations of apparatus components and processing steps related to time bundling of different AP SRS transmissions for channel estimation. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB). Node B, multi-standard radio (MSR) radio node such as MSR BS, multi-cell/mulhicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD. Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change its configuration and/or trigger a configuration, e.g., at least one setting and/or register entry and/or operational mode and/or channel coherence. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

As used herein, the combining of signals (e.g., SRSs), which have cross-time coherence, for channel estimation is referred to as time bundling for channel estimation.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
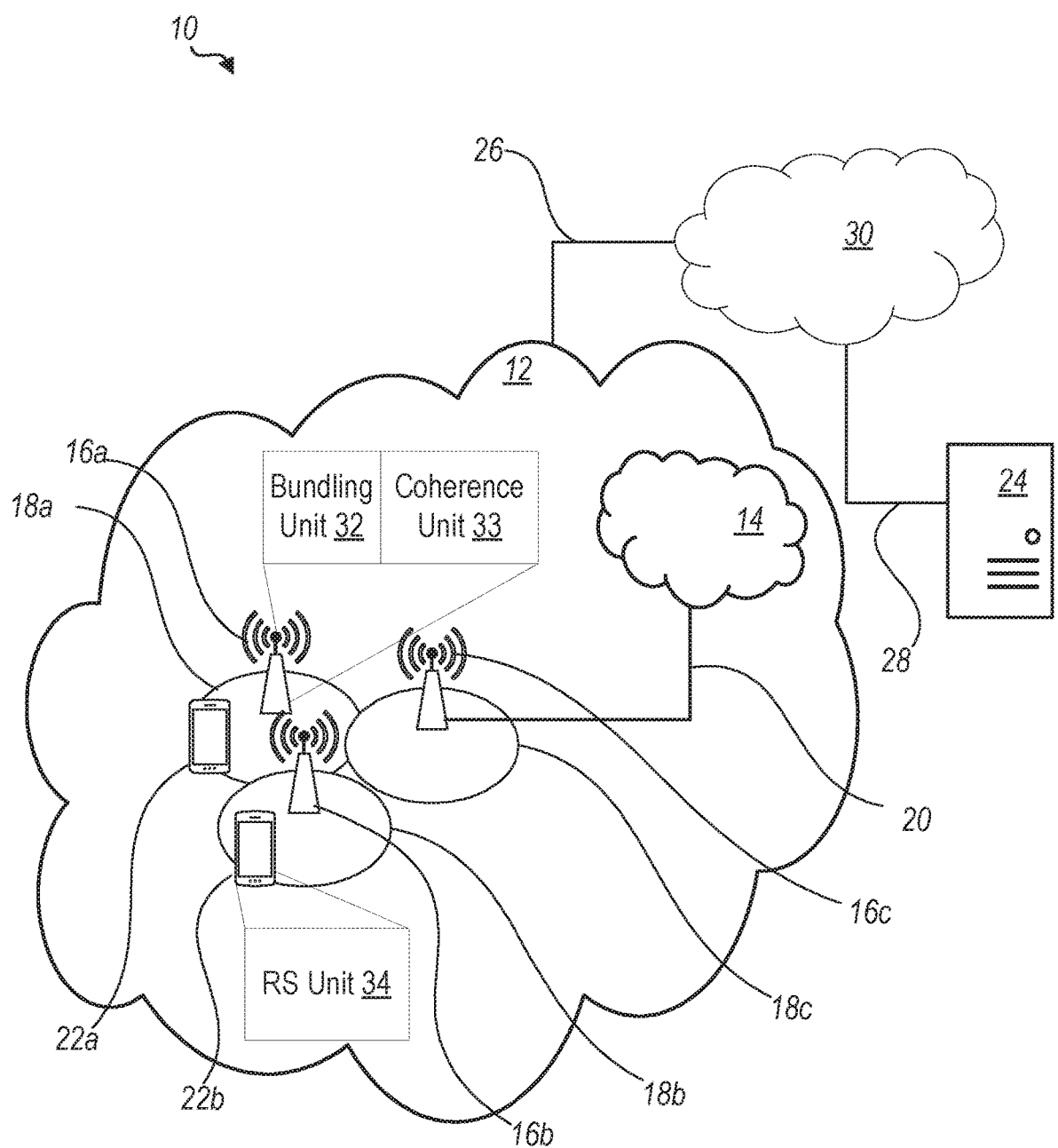
FIG. 3 is a schematic diagram of an exemplary network architecture illustrating a communication system connected via an intermediate network to a host computer according to the principles in the present disclosure.

Embodiments provide for time bundling of different AP SRS transmissions for channel estimation and for cross-time coherence using different resource type reference signal transmissions. Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22a, 22b and the host computer 24. The connectivity may be described as an over-the-top (OTT) connection. The host computer 24 and the connected WDs 22a. 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a bundling unit 32 which is configured to perform one or more network node 16 functions as described herein such as with respect to time bundling of different AP SRS transmissions for channel estimation. Further, a network node 16 is configured to include a coherence unit 33 which is configured to perform one or more network node 16 functions such as with respect to cross-time coherence using different resource type reference signal transmissions, as described herein. A wireless device 22 is configured to include a RS unit 34 which is configured to perform one or more wireless device 22 functions as described herein such as with respect to allowing for time bundling of different AP SRS transmissions for channel estimation and to cross-time coherence using different resource type reference signal transmissions, as described herein. Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to provide, process, transmit, receive, communication, store, relay, forward, provide, determine, etc., information related to time bundling of different AP SRS transmissions for channel estimation and/or related to cross-time coherence using different resource type reference signal transmissions.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include bundling unit 32 configured to perform one or more network node 16 functions as described herein such as with respect to time bundling of different AP SRS transmissions for channel estimation, as described herein. In another example, processing circuitry 68 of the network node 16 may include coherence unit 33 configured to perform one or more network node 16 functions as described herein such as with respect to cross-time coherence using different resource type reference signal transmissions.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a RS unit 34 configured to perform one or more wireless device 22 functions as described herein such as with respect to allowing for time bundling of different AP SRS transmissions for channel estimation and to cross-time coherence using different resource type reference signal transmissions, as described herein.

Figure 4:
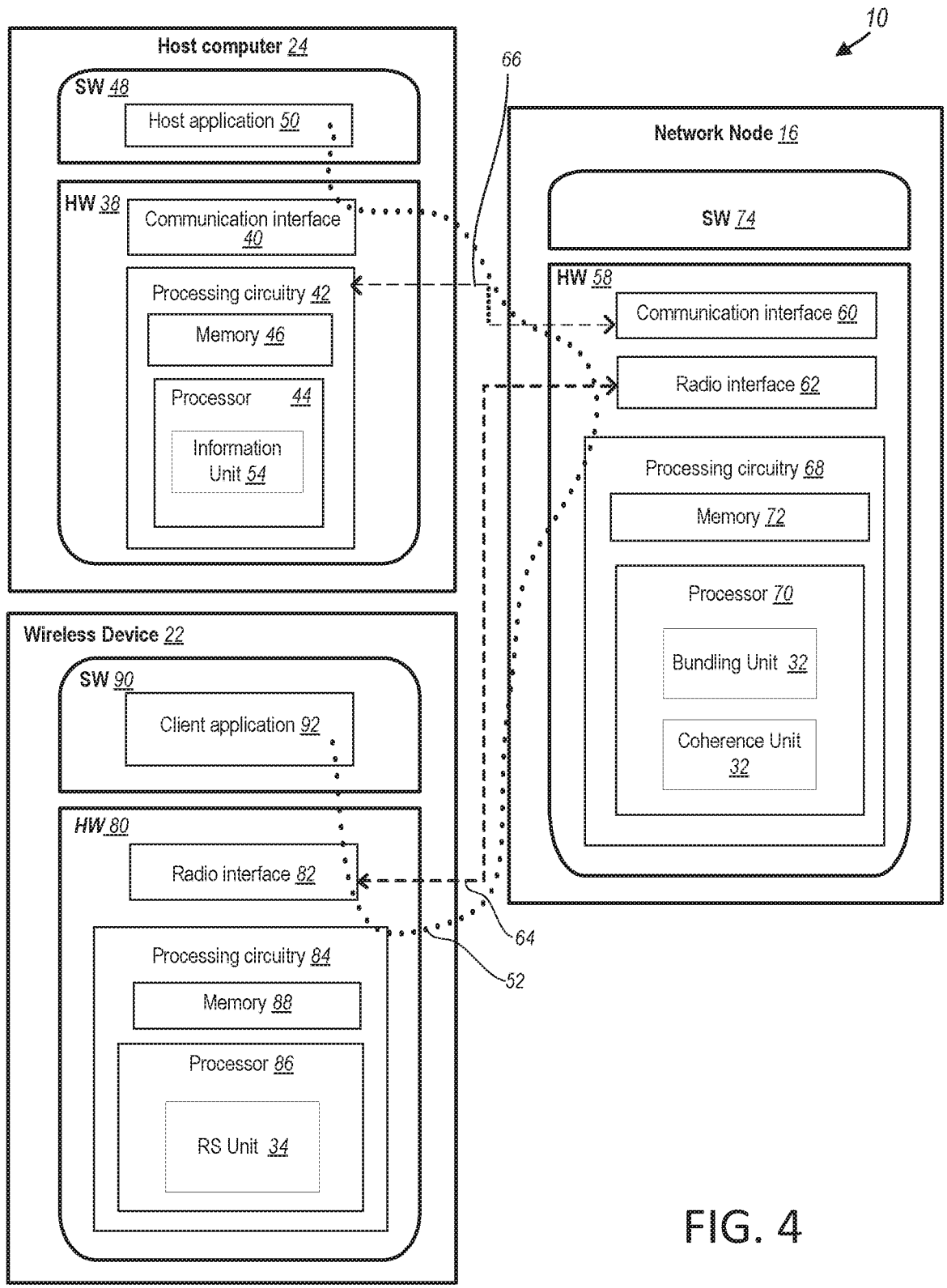
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission Lo the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as bundling unit 32, coherence unit 33, and RS unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 5, 6:
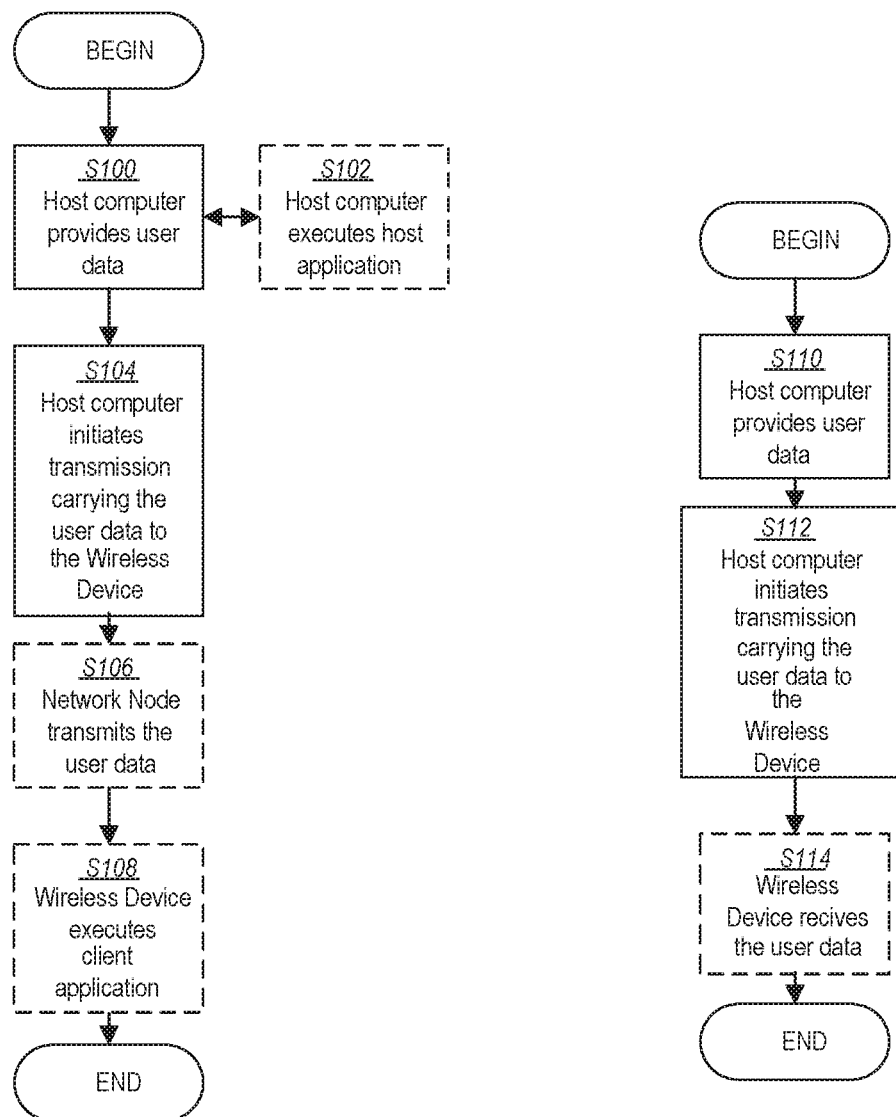
FIG. 5 is a flowchart illustrating exemplary methods implemented in a communication system including a host computer, a network node and a wireless device for executing a client application at a wireless device according to some embodiments of the present disclosure.
FIG. 6 is a flowchart illustrating exemplary methods implemented in a communication system including a host computer, a network node and a wireless device for receiving user data at a wireless device according to some embodiments of the present disclosure.

FIG. 5 is a flowchart illustrating an exemplary method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 6 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 7 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 8 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 9:
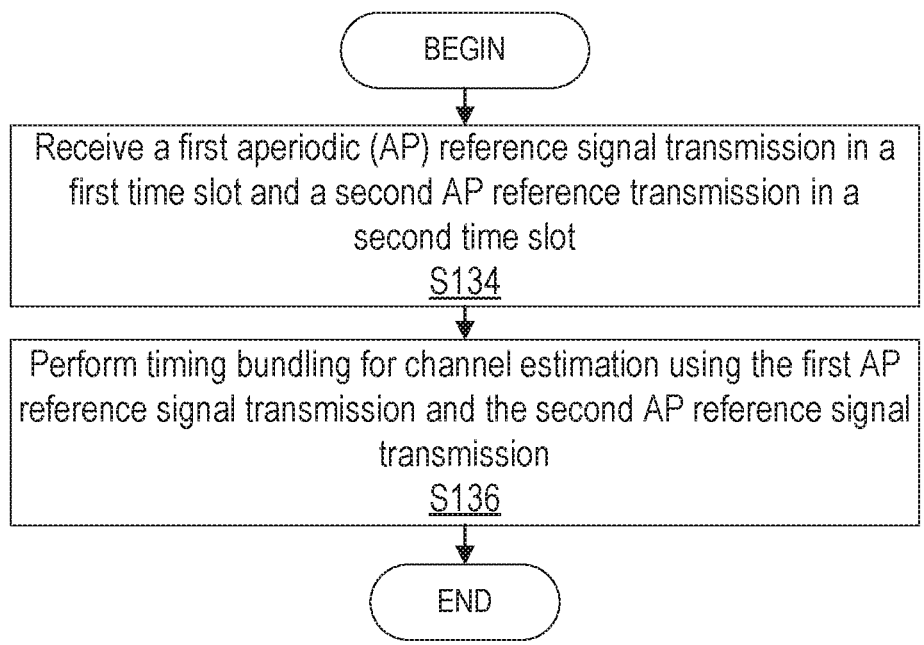
FIG. 9 is a flowchart of an example process in a network node according to some embodiments of the present disclosure.

FIG. 9 is a flowchart of an exemplary process in a network node 16 according to some embodiments of the present disclosure. One or more Blocks and/or functions performed by network node 16 may be performed by one or more elements of network node 16 such as by bundling unit 32 in processing circuitry 68, processor 70, radio interface 62, etc.

In one or more embodiments, network node 16 such as via one or more of processing circuitry 68, processor 70, bundling unit 32, communication interface 60 and radio interface 62 is configured to receive (Block S134) a first aperiodic (AP) reference signal transmission in a first time slot and a second AP reference transmission in a second time slot, as described herein. In one or more embodiments, network node 16 such as via one or more of processing circuitry 68, processor 70, bundling unit 32, communication interface 60 and radio interface 62 is configured to perform (Block S136) timing bundling for channel estimation using the first AP reference signal transmission and the second AP reference signal transmission, as described herein.

According to one or more embodiments, the processing circuitry 68 is further configured to trigger coherent SRS transmission, at the wireless device 22, using at least one of radio resource control, RRC, signaling and downlink control information, DCI where the time bundling for channel estimation being based on the triggered coherent SRS transmission, as described herein. According to one or more embodiments, the processing circuitry 68 is further configured to use a predefined reference signal-port-to-antenna-port mapping for performing the time bundling, as descried herein.

Figure 10:
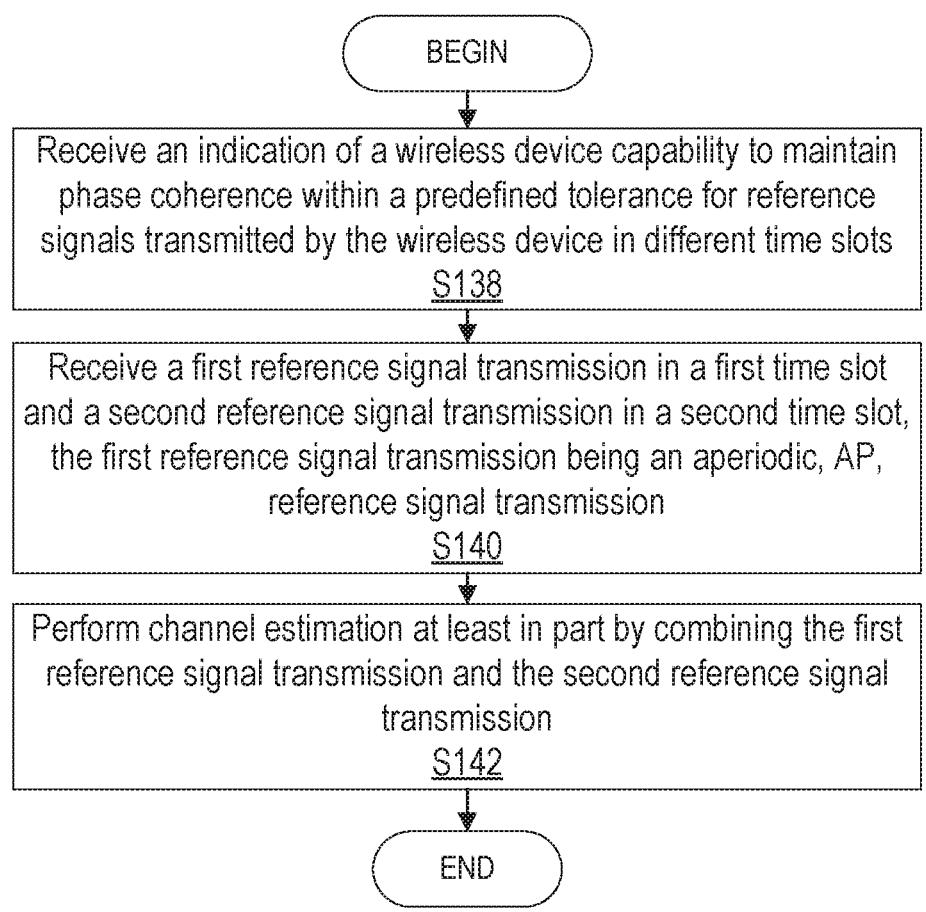
FIG. 10 is a flowchart of another example process in a network node according to some embodiments of the present disclosure.

FIG. 10 is a flowchart of another exemplary process in a network node 16 according to some embodiments of the present disclosure. One or more Blocks and/or functions performed by network node 16 may be performed by one or more elements of network node 16, such as by bundling unit 32 and/or coherence unit 33 in processing circuitry 68, processor 70, radio interface 62, etc. In one or more embodiments, network node 16 is configured to receive (Block S138) an indication of a wireless device capability to maintain phase coherence within a predefined tolerance for reference signals transmitted by the wireless device in different time slots, as described herein. Network node 16 is configured to receive (Block S140) a first reference signal transmission in a first time slot and a second reference signal transmission in a second time slot where the first reference signal transmission is an aperiodic, AP, reference signal transmission, as described herein. Network node 16 is configured to perform (Block S142) channel estimation at least in part by combining the first reference signal transmission and the second reference signal transmission, as described herein.

According to one or more embodiments, the second reference signal transmission is one of an AP reference signal transmission, a periodic reference signal transmission; and a semi-persistent reference signal transmission. According to one or more embodiments, the second reference signal transmission is the AP reference signal transmission. According to one or more embodiments, the processing circuitry 68 is further configured to determine whether at least one of a physical shared channel transmission and physical control channel transmission occurred during a time duration between the first reference signal transmission and the second reference signal transmission. The combining of the first reference signal transmission and the second reference signal transmission is based at least on the determination that the physical shared channel transmission and physical control channel transmission did not occur during the time duration.

According to one or more embodiments, the processing circuitry 68 is further configured to determine a first spatial relation of a first reference signal resource set associated with the first reference signal transmission, determine a second spatial relation of a second reference signal resource set associated with the second reference signal transmission, and determine whether the first spatial relation is the same as the second spatial relation. The combining of the first reference signal transmission and the second reference signal transmission is based at least on the determination that the first spatial relation is the same as the second spatial relation. According to one or more embodiments, the first reference signal transmission and the second reference signal transmission are associated with a same SRS trigger state. According to one or more embodiments, the second reference signal transmission is one of a periodic reference signal transmission and a semi-persistent reference signal transmission.

According to one or more embodiments, the processing circuitry 68 is further configured to determine whether a time separation between the first reference signal transmission and the second reference signal transmission meets a predefined time duration threshold where the combining of the first reference signal transmission and the second reference signal transmission is based at least on the determined time separation not meeting the predefined time duration threshold. According to one or more embodiments, the processing circuitry 68 is further configured to cause transmission of an indication that indicates for the wireless device 22 to use a cross-time coherence operation to maintain phase coherence within the predefined tolerance for reference signals transmitted in different time slots.

According to one or more embodiments, the indication is provided using one of downlink control information, DCI, signaling and radio resource control, RRC, signaling. According to one or more embodiments, a DCI format of the DCI indicates SRS resources and a portion of a frequency band for transmitting the first reference signal transmission.

Figure 11:
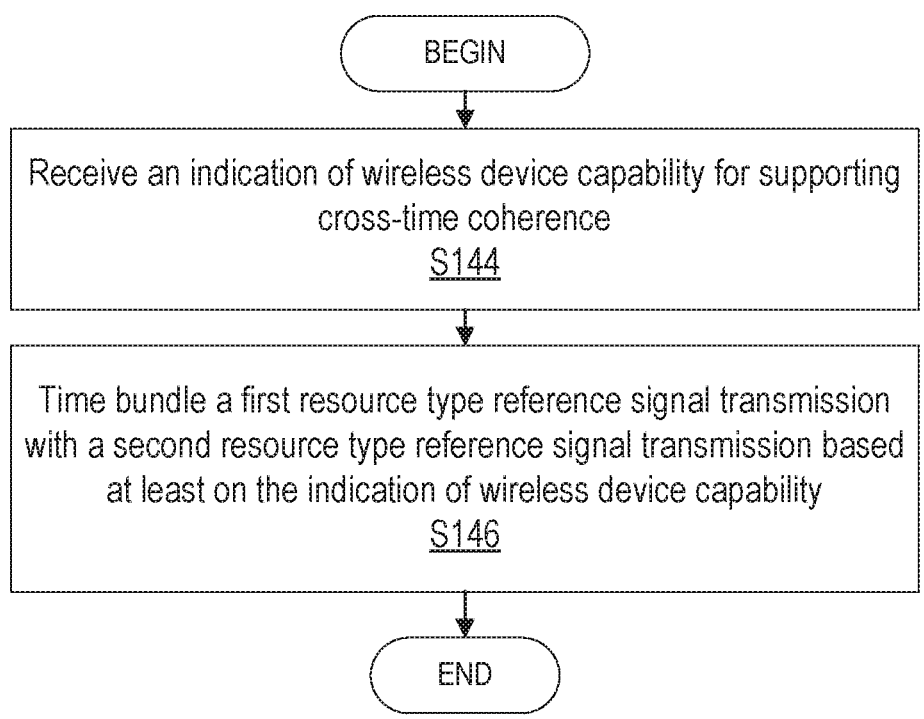
FIG. 11 is a flowchart of another example process in a network node according to some embodiments of the present disclosure.

FIG. 11 is a flowchart of another exemplary process in a network node 16 according to some embodiments of the present disclosure. One or more Blocks and/or functions performed by network node 16 may be performed by one or more elements of network node 16, such as by coherence unit 33 in processing circuitry 68, processor 70, radio interface 62, etc. In one or more embodiments, network node 16 such as via one or more of processing circuitry 68, processor 70, coherence unit 33, communication interface 60 and radio interface 62 is configured to receive (Block S144) an indication of wireless device capability for supporting cross-time coherence, as described herein. In one or more embodiments, network node 16 such as via one or more of processing circuitry 68, processor 70, coherence unit 33, communication interface 60 and radio interface 62 is configured to time bundle (Block S146) a first resource type reference signal transmission with a second resource type reference signal transmission based at least on the indication of wireless device capability, as described herein.

According to one or more embodiments, the first resource type is one of a periodic, P, resource type and semi-persistent, SP, resource type, the second resource type is an aperiodic, AP, resource type. According to one or more embodiments, the first resource type reference signal transmission uses different SRS ports than the SRS ports used by the second type resource reference signal transmission. According to one or more embodiments, the SRS port mapping of the SRS ports are one of indicated by the wireless device 22 and predefined by a wireless communication standard.

Figure 12:
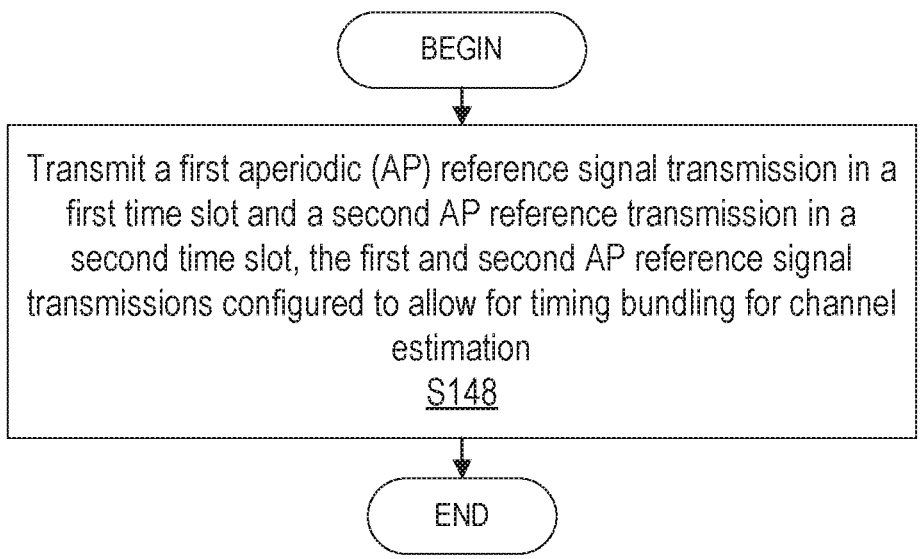
FIG. 12 is a flowchart of an exemplary process in a wireless device according to some embodiments of the present disclosure.

FIG. 12 is a flowchart of an exemplary process in a wireless device 22 according to some embodiments of the present disclosure. One or more Blocks and/or functions performed by wireless device 22 may be performed by one or more elements of wireless device 22 such as by RS unit 34 in processing circuitry 84, processor 86, radio interface 82, etc. In one or more embodiments, wireless device such as via one or more of processing circuitry 84, processor 86, RS unit 34 and radio interface 82 is configured to transmit (Block S148) a first aperiodic (AP) reference signal transmission in a first time slot and a second AP reference transmission in a second time slot where the first and second AP reference signal transmissions are configured to allow for timing bundling for channel estimation, as described herein.

According to one or more embodiments, the processing circuitry is further configured to receive at least one indication to trigger coherent SRS transmission where the indication is received via at least one of radio resource control, RRC, signaling and downlink control information, DCI, and where the triggered coherent SRS transmission is configured to allow for the time bundling for channel estimation, as described herein. According to one or more embodiments, the processing circuitry 84 is further configured to use a predefined reference signal-port-to-antenna-port mapping for the first and second AP SRS transmissions where the predefined reference signal-port-to-antenna-port mapping is configured to allow for the time bundling for channel estimation, as described herein.

Figure 13:
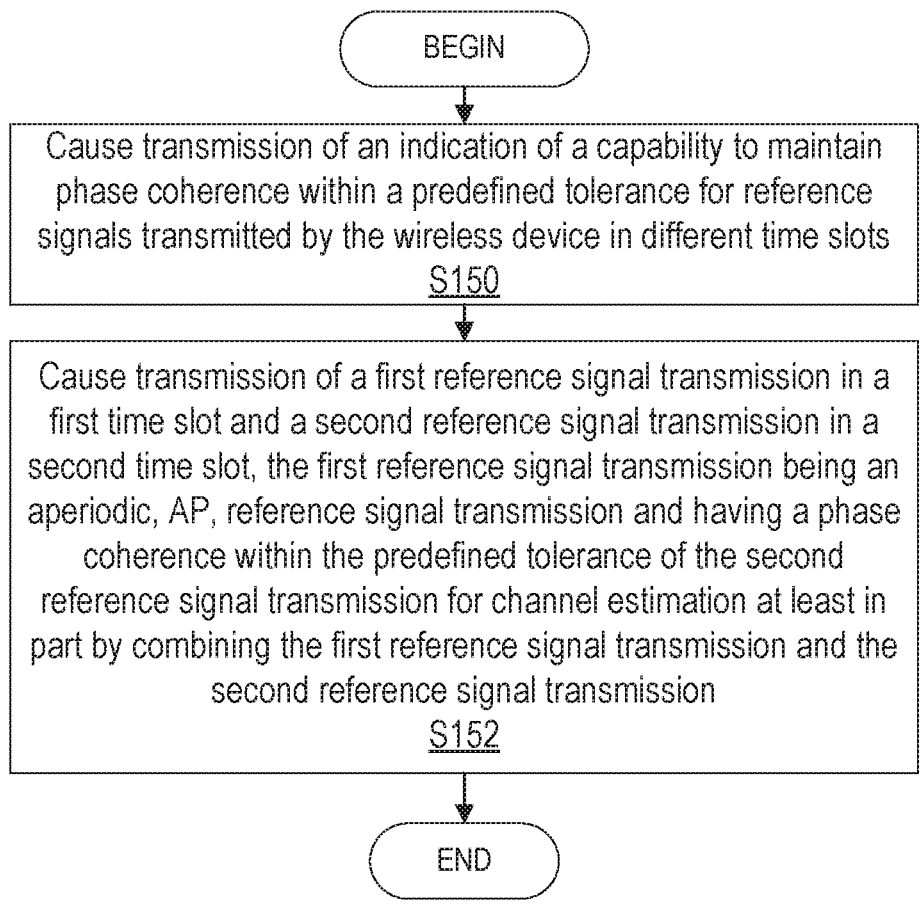
FIG. 13 is a flowchart of an exemplary process in a wireless device according to some embodiments of the present disclosure.

FIG. 13 is a flowchart of another exemplary process in a wireless device 22 according to some embodiments of the present disclosure. One or more Blocks and/or functions performed by wireless device 22 may be performed by one or more elements of wireless device 22 such as by RS unit 34 in processing circuitry 84, processor 86, radio interface 82, etc. In one or more embodiments, wireless device 22 is configured to cause (Block S150) transmission of an indication of a capability to maintain phase coherence within a predefined tolerance for reference signals transmitted by the wireless device 22 in different time slots, as described herein. Wireless device 22 is configured to cause (Block S152) transmission of a first reference signal transmission in a first time slot and a second reference signal transmission in a second time slot where the first reference signal transmission is an aperiodic, AP, reference signal transmission and having a phase coherence within the predefined tolerance of the second reference signal transmission for channel estimation at least in part by combining the first reference signal transmission and the second reference signal transmission.

According to one or more embodiments, the second reference signal transmission is one of: an AP reference signal transmission; a periodic reference signal transmission; and a semi-persistent reference signal transmission. According to one or more embodiments, the second reference signal transmission is the AP reference signal transmission. According to one or more embodiments, the combining of the first reference signal transmission and the second reference signal transmission is based at least on a physical shared channel transmission and physical control channel transmission not occurring during a time duration between the first reference signal transmission and the second reference signal transmission.

According to one or more embodiments, the combining of the first reference signal transmission and the second reference signal transmission is based at least on a first spatial relation of the first reference signal transmission having a same spatial relation as a second spatial relation of the second reference signal transmission. According to one or more embodiments, the first reference signal transmission and the second reference signal transmission are associated with a same SRS trigger state. According to one or more embodiments, the second reference signal transmission is one of a periodic reference signal transmission and a semi-persistent reference signal transmission.

According to one or more embodiments, the combining of the first reference signal transmission and the second reference signal transmission is based at least on a time separation between the first reference signal transmission and the second reference signal transmission not meeting a predefined time duration threshold. According to one or more embodiments, the processing circuitry 84 is further configured to receive of an indication that indicates for the wireless device 22 to use a cross-time coherence operation to maintain phase coherence within the predefined tolerance for reference signals transmitted in different time slots.

According to one or more embodiments, the indication is provided using one of downlink control information, DCI, signaling and radio resource control, RRC, signaling. According to one or more embodiments, a DCI format of the DCI indicates SRS resources and a portion of a frequency band for transmitting the first reference signal transmission. According to one or more embodiments, the processing circuitry 84 is further configured to override a configured transmission control parameter to cause transmission of the first reference signal transmission and second reference signal transmission at a same transmission power. According to one or more embodiments, the processing circuitry 84 is further configured to apply a same SRS-port-to-antenna-port mapping for both the first and second reference signal transmissions.

Figure 14:
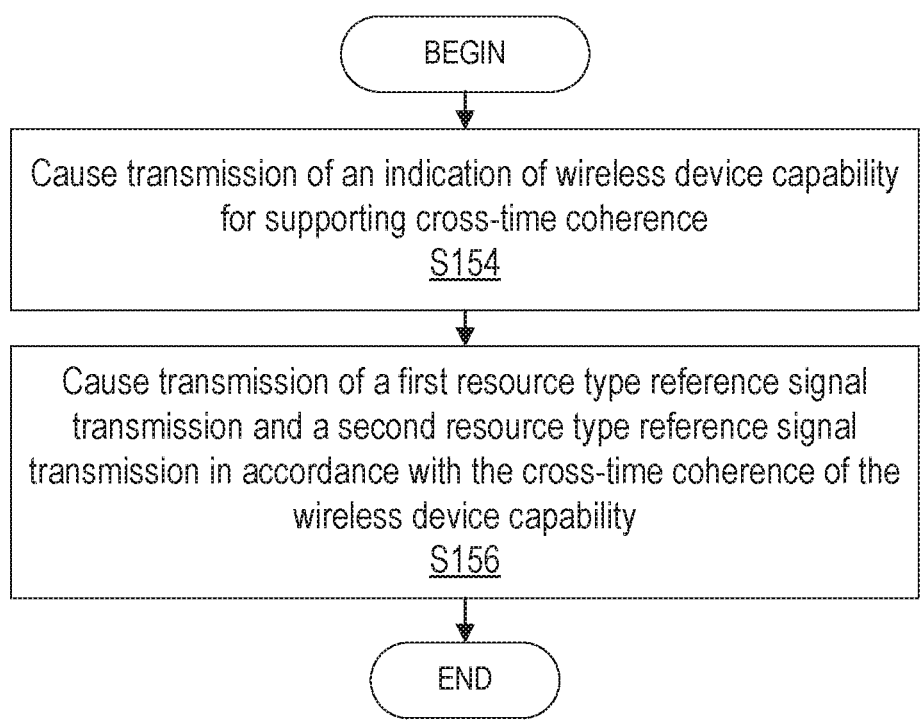
FIG. 14 is a flowchart of an exemplary process in a wireless device according to some embodiments of the present disclosure.

FIG. 14 is a flowchart of another exemplary process in a wireless device 22 according to some embodiments of the present disclosure. One or more Blocks and/or functions performed by wireless device 22 may be performed by one or more elements of wireless device 22 such as by RS unit 34 in processing circuitry 84, processor 86, radio interface 82, etc. In one or more embodiments, wireless device 22 such as via one or more of processing circuitry 84, processor 86, RS unit 34 and radio interface 82 is configured to cause (Block S154) transmission of an indication of wireless device capability for supporting cross-time coherence, as described herein. In one or more embodiments, wireless device 22 such as via one or more of processing circuitry 84, processor 86, RS unit 34 and radio interface 82 is configured to cause (Block S156) transmission of a first resource type reference signal transmission and a second resource type reference signal transmission in accordance with the cross-time coherence of the wireless device capability, as described herein.

According to one or more embodiments, the first resource type is one of a periodic, P, resource type and semi-persistent, SP, resource type, the second resource type is an aperiodic, AP, resource type. According to one or more embodiments, the first resource type reference signal transmission uses different SRS ports than the SRS ports used by the second type resource reference signal transmission. According to one or more embodiments, the SRS port mapping of the SRS ports are one of indicated to the network node 16 and predefined by a wireless communication standard.

Having generally described arrangements for time bundling of different AP SRS transmissions for channel estimation, details for these arrangements, functions and processes are provided as follows, and for cross-time coherence using different resource type reference signal transmissions, which may be implemented by the network node 16, wireless device 22 and/or host computer 24.

Time Bundling of Different AP SRS Transmissions

Embodiments provide for time bundling of different AP SRS transmissions for channel estimation. New wireless device 22 capability may be introduced in a further 3GPP release, such as in NR 3GPP Release 17, where wireless devices 22 may have the ability to maintain the phase (and possibly amplitude) of two signals transmitted in different slots. As described herein, the capability to maintain phase coherence in different slots is referred to as cross-time coherence. If a wireless device 22 is capable of cross-time coherence, the receiver (i.e., the network node 16) can directly combine the channel estimates from an SRS resource transmitted in a first frequency band in one slot, and in a second frequency band in a second slot and determine a channel estimate over the full frequency bandwidth. The combining of signals (e.g., SRSs), which have cross-time coherence, for channel estimation is referred to as time bundling for channel estimation.

Embodiment 1 (Both RRC Configuration and DCI)

In one embodiment, if the wireless device 22 is configured with a higher-layer signaling parameter timeBundling-r17, such as by the network node 16 that enables coherent SRS transmission (coherent within the predefined bounds/parameter(s), for example such as those specified by 3GPP Radio Access Network Work Group 4 (RAN4)), then two (or more) consecutive AP SRS transmissions, triggered from the same SRS trigger state in DC (or potentially from two different SRS trigger states), can be assumed to be time coherent. Hence, the network node 16 can coherently combine the channel estimates, for each SRS antenna port, of the two (or more) AP SRS transmissions.

Alternatively, the network node 16 may use the pilot sequences transmitted during the two (or more) slots to form a new channel estimate. The wireless device 22 has the responsibility to keep the two (or more) transmissions coherent. A time threshold may be specified, so if the time separation between the two (or more) SRS transmissions, or between the first SRS transmission and the DCI that triggers the subsequent SRS transmissions, is shorter than the time threshold, then the two (or more) SRS transmissions can be assumed to be coherent, otherwise the receiver (i.e., the network node 16) may not make this assumption. This time threshold can be indicated from the wireless device 22 to the network node 16 through, e.g., a wireless device 22 capability signaling message using RRC.

In a further alternative embodiment, only the wireless device 22 capability signaling is received and there is no timeBundling-r17 parameter signaled back to the wireless device 22 from the network node 16 to enable the feature of coherent SRS transmission such as coherence among at least two SRS transmissions. Instead, if the wireless device 22 has reported the wireless device 22 capability for coherent SRS transmission (i.e., the wireless device 22 supports cross-time coherence), then this can be assumed by the network node 16 when triggering and receiving two or more AP SRS (within a threshold time).

In one embodiment, if the time duration between a first and a second AP SRS transmission contains a downlink reception by the wireless device 22 (e.g., a PDCCH or a PDSCH), or contains of one or more DL slots, then time coherency between first and second AP SRS is not assumed to hold.

Figure 15:
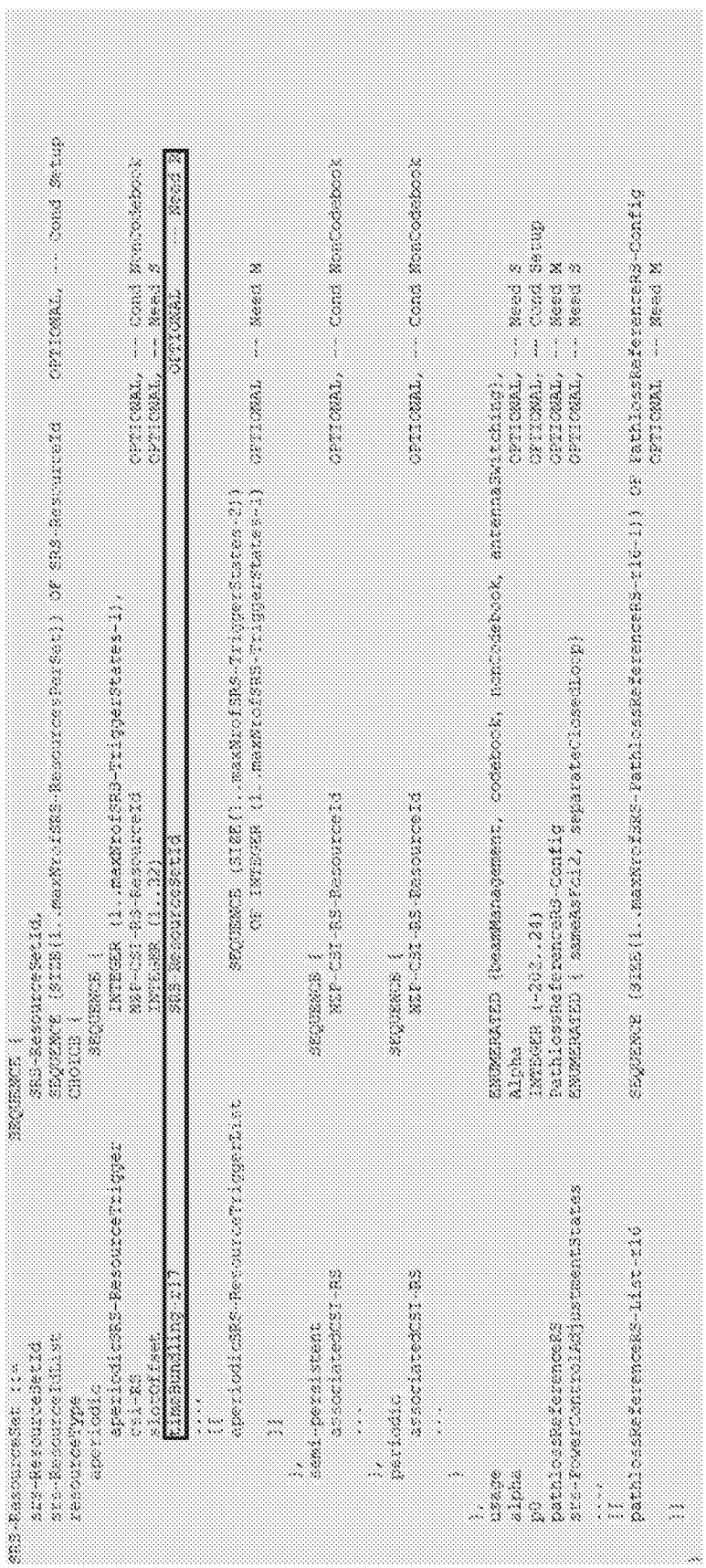
FIG. 15 is a diagram of configuration of an SRS resource set with a timeBudling-r17 field according to some embodiment of the present disclosure.

In one embodiment of such enabling of time bundling using RRC signaling an extra field may be added in the SRS resource set configuration, as illustrated with bold rectangular outline in FIG. 15, where the extra field first indicates that the wireless device 22 is to use cross-time coherence operation (i.e., SRS time bundling). The extra field may also be used to indicate which AP SRS set that another AP SRS set should be bundled with, an example of which is illustrated in FIG. 15, where the extra field is denoted timeBundling-r17. In one embodiment, the field timeBundling-r17 is a Boolean operator (instead of an SRS resource set ID) indicating if different SRS transmission of the same aperiodic SRS resource set should be time bundled or not. For example, if the Boolean operator is set to 'true', different SRS transmissions of the same aperiodic SRS resource set may be time bundled with each other (as long as the SRS transmissions occurs within a threshold time).

In one embodiment, the DCI is used by network node 16 to trigger an AP SRS resource set includes one additional flag, where if the flag is equal to 1, the SRS resource set may be time bundled with the other SRS resource set indicated in the field timeBundling-r17.

In one embodiment, if the additional flag in the DCI is set to 1 by network node 16, when the wireless device 22 is triggered to transmit an AP SRS resource set, the wireless device 22 is also triggered with the AP SRS resource set in the field timeBundling-r17. In this way, by setting the flag to 1, the network node 16 can trigger both AP SRS resource sets with one single DCI.

When two AP SRS are time bundled, the wireless device 22 may apply the same SRS-port-to-antenna-port mapping for both AP SRS transmissions (and/or the network node 16 may be aware of how the wireless device 22 performs the SRS-port-to-antenna-port mapping for the two SRS resource sets). The wireless device 22 may then also maintain coherence (phase) over time for an SRS port in the first AP SRS with the SRS port in the second triggered AP SRS. In this way, the network node 16 can directly combine coherently the channel estimates of the two AP SRS transmissions, which improves the SNR of the channel estimate and/or extends the SRS transmission bandwidth.

In one variation of this embodiment, the wireless device 22 may also apply the same transmission power for the respective SRS ports for both AP SRS resource sets that are time bundled. This same transmission power feature may be useful in case it is easier for the wireless device 22 to maintain cross-time phase coherency between the two AP SRS resource sets when they are transmitted with the same output power. This indicates or means that the wireless device 22 may override the power-control parameters used in one of the AP SRS resource (in case they are different). In one embodiment, the network node 16 always overwrites the power-control parameters for the AP SRS resource set that was not triggered in the AP SRS trigger state. In another embodiment, cross-time coherence is not assumed to hold if the power-control parameters are changed from the first to the second AP SRS transmission. In this case, the receiver (i.e., network node 16) can assume time coherency across the two AP SRS transmissions only if the power-control parameters are the same for both AP SRS resource sets.

If a different number of SRS ports at the wireless device 22 is used in the two AP SRS resource sets that may be bundled, either the wireless device 22 is allowed to maintain the transmission power per SRS port or the wireless device 22 is allowed to maintain the same amount of power per antenna port (if one SRS port is transmitted per antenna port, then these two cases are equivalent).

In one embodiment, in case the spatial relations are different for the SRS resources in the first and second AP SRS resource set that are time bundled, the wireless device 22 may override the spatial relation of the AP SRS resource set that was not indicated in the DCI (but was indicated in the field timeBundling-r17). In another embodiment, the time coherence is not assumed to hold if the spatial relation is not the same in the first and the second AP SRS transmission. In this case, the receiver (i.e., network node 16) can assume time coherency across the two AP SRS transmissions only if the spatial relation is the same for both AP SRS resource sets.

Embodiment 2 (Mainly DCI)

For some examples of this embodiment, only DCI updates are needed (but in some examples also RRC signaling is used) for providing time bundling features. In one version, the DC triggering AP SRS resource sets contains an additional AP SRS trigger bitfield (which indicates and/or means that there are two bitfields that can be used to trigger two AP SRS sets in one DCI). In one embodiment, this extra bitfield is present only if a wireless device 22 signals in wireless device 22 capability that it supports this feature or if the wireless device 22 is configured with a higher-layer parameter that enables SRS time bundling (could be configured for example in SRS-config information element (IE)). When both bitfields point to two different AP SRS resource sets, it means and/or indicates that the wireless device 22 may time bundle these two AP SRS resource set (and, for example, use the power control and spatial relation of the SRS resource set connected to the first AP SRS trigger bitfield for both AP SRS resource sets).

In another embodiment, a joint encoding is used for the AP trigger states bitfield of an DCI, such that some of the codepoints of this bitfield point to two SRS resource sets, and when the bitfield points to two AP SRS resource sets, the wireless device 22 should assume/determine that they should be bundled.

In an additional embodiment, the DCI includes a Boolean bitfield (instead of a bitfield for an SRS resource set ID), and when it is set to 'true' the SRS resource set triggered may be time bundled with the last time that SRS resource set were triggered.

Extension of the Present Disclosure

If the same SRS ports is used in the first and second AP SRS resource set (or if the SRS resource set is time bundled with itself), then it is straightforward for the wireless device 22 to apply the same SRS-port-to-antenna-port-mapping for both AP SRS transmissions. The antenna ports may be part of radio interface 82. However, if different SRS ports are used in the two triggered AP SRS resource sets, there may need to be some rule defined so that the network node 16 knows how the wireless device 22 maps the SRS ports to the antenna ports.

One way to provide the mapping information is to let the wireless device 22 use the same sequential order when mapping SRS ports to antenna ports for both AP SRS resource sets. One example of such sequential ordering is as follows: start with mapping the SRS ports belonging to SRS resources with lowest SRS resource ID number first, and map SRS ports within each SRS resource in sequential order, starting with the SRS port with lowest number. One example of this mapping is illustrated in FIG. 16 for a wireless device 22 with 4 transmit-antenna ports and 4 receive-antenna ports, where there is one AP SRS resource set with one 4-port AP SRS resource, and another AP SRS set with two 2-port SRS resources. Note that this is just one example of how to help ensure that the network node 16 knows which SRS port to antenna port mapping that the wireless device 22 applies.

Note that while one or more embodiments described herein were described such that SRS time bundling may only be used when the wireless device 22 has the capability cross-time coherency and that when time bundling is used, the wireless device 22 may maintain the phase of respective SRS ports over the multiple SRS transmissions, with a smart receiver at the network node 16, time bundling can be useful also when the wireless device 22 cannot maintain the phase between different SRS transmissions. Hence, the teachings described herein may be applicable to situations other than when the wireless device 22 is capable of cross-time coherency.

Therefore, one or more embodiments described herein provide a configuration from the network node 16, or an indication from the wireless device 22, or both, to the wireless device 22 that allows the network node 16 to perform reception assuming received channel coherency (time bundling) for a given antenna port in the first and second AP SRS transmission (unless, for example, the AP SRS transmissions are too far spaced apart in time), across SRS resources for two (or more) different AP SRS transmission.

Cross-Time Coherence Using Different Resource Type Reference Signal Transmissions Further, in one or more embodiments, a configuration from the network node 16 to the wireless device 22 is provided where the configuration that allows the network node to perform time bundling across SRS resource set transmissions of different resourceType, where resourceType can be P, SP or AP.

As SP and P SRS resources may be indistinguishable from the perspective of the instant disclosure, only P resources will be discussed and mentioned further below, but "P" SRS resources may correspond to "P" SRS resources or "SP" SRS resources.

One or more embodiments relate to when a P SRS resource is time bundled together with an AP SRS resource and where the time between the P SRS transmission occasion and the AP SRS transmission is short (e.g., shorter than the coherence time of the channel, which may be predefined or determinable), as in the adjacent slot or even in the same slot. Hence, the periodicity T of the P resource can be kept long (e.g., longer than periodicity in existing systems), but may be configured with an AP triggered SRS, which due to time bundling, improves the coverage (i.e., improves signal-to-noise ratio (SNR)) and/or quality of the SRS channel estimates).

Time bundling between SRS resource sets such as by network node 16 for example, that the receiver (i.e., network node 16) can assume that an SRS port in one or more SRS resources of a first SRS resource set is the same SRS port as in one or more SRS resources in a second SRS resource set (or in more general terms, the network node 16 may need to know how the SRS ports in the first SRS transmission relate to the SRS ports in the second SRS transmission). The first SRS set and second SRS set may be transmitted in different OFDM symbols or even in different slots such as by wireless device 22. If the same SRS ports are used in the AP SRS resource set(s) as in the P SRS resource set then the wireless device 22 may apply the same SRS-port-to-antenna-port-mapping for both the AP and the P SRS transmission. However, if different SRS ports are used in the P and AP SRS resource sets, there may need to be some implicit rule defined so the wireless device 22 knows which SRS ports that should be mapped to which antenna ports.

In one or more embodiments where different SRS ports are used in P and AP SRS, the wireless device 22 uses the same sequential ordering when mapping SRS ports to antenna ports for the AP SRS transmission as for the P SRS transmission, thereby allowing the network node 16 to determine or have knowledge of the mapping as described herein. One example of such sequential ordering is as follows: start with mapping the SRS ports belonging to SRS resources with lowest SRS resource ID number first, and map SRS ports within each SRS resource in sequential order, starting with the SRS port with lowest number. One example of this is illustrated in FIG. 17 for a wireless device 22 with 4 transmit-antenna ports and 4 receive-antenna ports, where there is one P SRS resource set with one 4-port AP SRS resource, and one AP SRS set with two 2-port SRS resources. Again, this is just one example of how to help ensure that the network node 16 has knowledge of the relation between the different SRS ports of the different SR transmissions.

From the transmitter perspective (i.e., wireless device 22 perspective), when time bundling is enabled between transmitted ports (could be for SRS but could also be for DM-RS) then the port(s) in the first and second set (as described in the previous paragraph) may preferably be phase (and possibly amplitude) coherent within a reasonable tolerance (i.e., within a predefined tolerance). Coherence may mean, in this aspect, that for a time-invariant channel, the receiver (i.e., network node 16) measures the same (within the allowed tolerance) effective channel (i.e., including the transmitter (e.g., network node 16) and receiver (e.g., wireless device 22) hardware) when using the port in the first and second SRS resource set, respectively. The transmitter (typically the wireless device 22) has thus managed to maintain phase (and possibly amplitude) coherence over time. This coherence over time property is a property that neither an NR wireless device 22 nor a LTE wireless device 22 support, in existing wireless communication standards, for transmissions that occur in different slots. In the following, this coherence over time property is a wireless device 22 property that will be referred to as cross-time coherence, below.

In addition, NR 3GPP Release 15 specifies coherent codebooks for UL MIMO precoding. The coherence in this case is related to phase coherence between SRS ports within an SRS resource. If this type of coherence is supported, here referred to as cross-port coherence, then the relative phase between two SRS ports in an SRS resource is unchanged (within an allowed tolerance) across time, e.g., from the time of SRS measurements to the time of PUSCH transmission.

One example of time bundling between two SRS resource sets for the case such as via network node 16 when cross-time coherence holds is when the two sets have one SRS resource each, and where each SRS resource have two SRS ports, for which the SRS-port-to-antenna-port mapping is the same for both SRS resource sets. In this case, the receiver (i.e., the network node 16) can combine the channel estimates from the received first SRS resource with the channel estimates from the received second SRS resource, thereby likely improver channel estimation. A simple combining is per-SRS-port linear averaging of the channel estimate.

One or more methods to enable or disable time bundling in the wireless device 22 such as via network node 16 can be either semi-static (enabled and disabled by RRC) or dynamic (enabled/disabled by DCI). In any case, prior to such enabling, it may be assumed that the wireless device 22 reports to the network a capability of supporting cross-time coherence. This signaling can be explicit (e.g., an RRC parameter "SRS-cross-time-coherence") or implicit (e.g., tied and indicated based on some other wireless device 22 capability signaled such as supporting cross-port coherence (coherent codebook) or a new RRC parameter that includes multiple features such as DM-RS and SRS time bundling, e.g., "Time-bundling-R17"). After such signaling is received and processed by the network node 16, the time bundling can be enabled by network node 16 to wireless device 22 signaling.

In one embodiment of such enabling of time bundling using RRC signaling, an extra field can be added in the SRS resource set configuration, as indicated by a bold rectangle outline in FIG. 15, where the extra field first indicates that the wireless device 22 may maintain cross-time coherence. The extra field may also be used to indicate which P SRS set that an AP SRS set may be time bundled with. If the wireless device 22 is triggered with transmission of the AP SRS set, the wireless device 22 may apply the same SRS-port-to-antenna port mapping for both the AP SRS set and the P SRS set indicated in the field timeBundling-r17. Hence, when configured, the wireless device 22 may maintain coherence over time for an SRS port in the P set with the associated SRS port in the triggered AP set. The network node 16 can then combine, coherently, the channel estimates of the P and AP sets, which improves the SNR of the channel estimate.

In one variation of one or more embodiments, the wireless device 22 may also apply the same transmission power for respective SRS port/resource for both the AP SRS resource set and the P SRS resource set. This application of the same transmission power may be useful in case it is easier, in the implementation of wireless devices 22, to maintain cross-time coherence between the two SRS sets (i.e., the AP SRS set and P SRS set) when they are transmitted with the same output power. This means that the wireless device 22 may override the power-control parameters used in either the P SRS resource set or the AP SRS resource set. In one embodiment, the network node 16 may always overwrite the power-control parameters used for the AP SRS resource set such that the AP SRS transmission instead applies the same output power as was used for the last or immediately preceding P SRS transmission (i.e., the same output power may be used per SRS port for the P and AP SRS transmission, which gives the same output power per antenna port, since the same SRS-port-to-antenna-port mapping may be applied). If a different number of SRS ports are used for the P and AP SRS transmissions, in one or more embodiment, the transmission power per SRS port is maintained, or the same amount of power per antenna port is maintained.

In one embodiment, in cases where the spatial relations are different for the AP SRS resource(s) and the P SRS resource(s), the wireless device 22 may override the spatial relation of the AP SRS resource(s) to match the spatial relation of the P SRS resource(s).

In one or more embodiments related to dynamic indication of enabling of time bundling, the time bundling may be configured by RRC but not enabled until triggered by the DCI. In this case, a code point in DCI Format 0_1 (or any other DCI format that triggers AP SRS) may be used to indicate whether the wireless device 22 may assume SRS time bundling for the triggered AP SRS resource set or not. A code point can be a combination of information elements (IEs) in the DCI or it can be a new IE, or field, which purpose or sole purpose is to perform the time bundling indication (e.g., a 1-bit IE includes or indicates a "flag" indicating code point). In one or more embodiments, the time bundling information enabling the time bundling is included in the AP SRS trigger states in the DCI. The "flag" can this be encoded per trigger state. Hence, some trigger states may have time bundling enabled while others do not, giving flexibility to the network node 16 to use bundling or not, in a dynamic manner.

When the flag or code point is set to, e.g., "1", the wireless device 22 may apply the rules described above (i.e., the RRC-based configuration) for the AP SRS set (i.e., the same SRS port-to-antenna port mapping as the P SRS Set, etc.), but when the flag or code point is set to e.g. "0", the wireless device 22 may assume that no time bundling is to be used between the AP SRS set and the P SRS set (for that AP SRS transmission occasion or possibly for more than one AP SRS transmission occasion). In this case, the wireless device 22 can select an arbitrarily SRS port-to-antenna port mapping for the AP SRS transmissions.

In cases that may make use of a new IE in the DCI format 0_1, the bitfield carrying the flag in DCI Format 0_1 may only need to be present if the field timeBundling-r17 is present in any of the configured AP SRS set(s).

In one or more embodiments, an extra bitfield or a code point or an AP SRS trigger state in the DCI format 0_1 triggering the AP SRS (or any other DCI that triggers AP SRS) set using time bundling may be included, which may be used to also indicate which SRS resources/ports and which part of the frequency band that may be sounded (i.e., that may include the SRS transmission) by the AP SRS set. In this manner, in case the network node 16 has poor CSI for a certain SRS port (i.e., the wireless device 22 antenna port) or frequency band, the extra AP SRS transmission can be used to focus the available output power where such output power may be needed.

Figure 18:
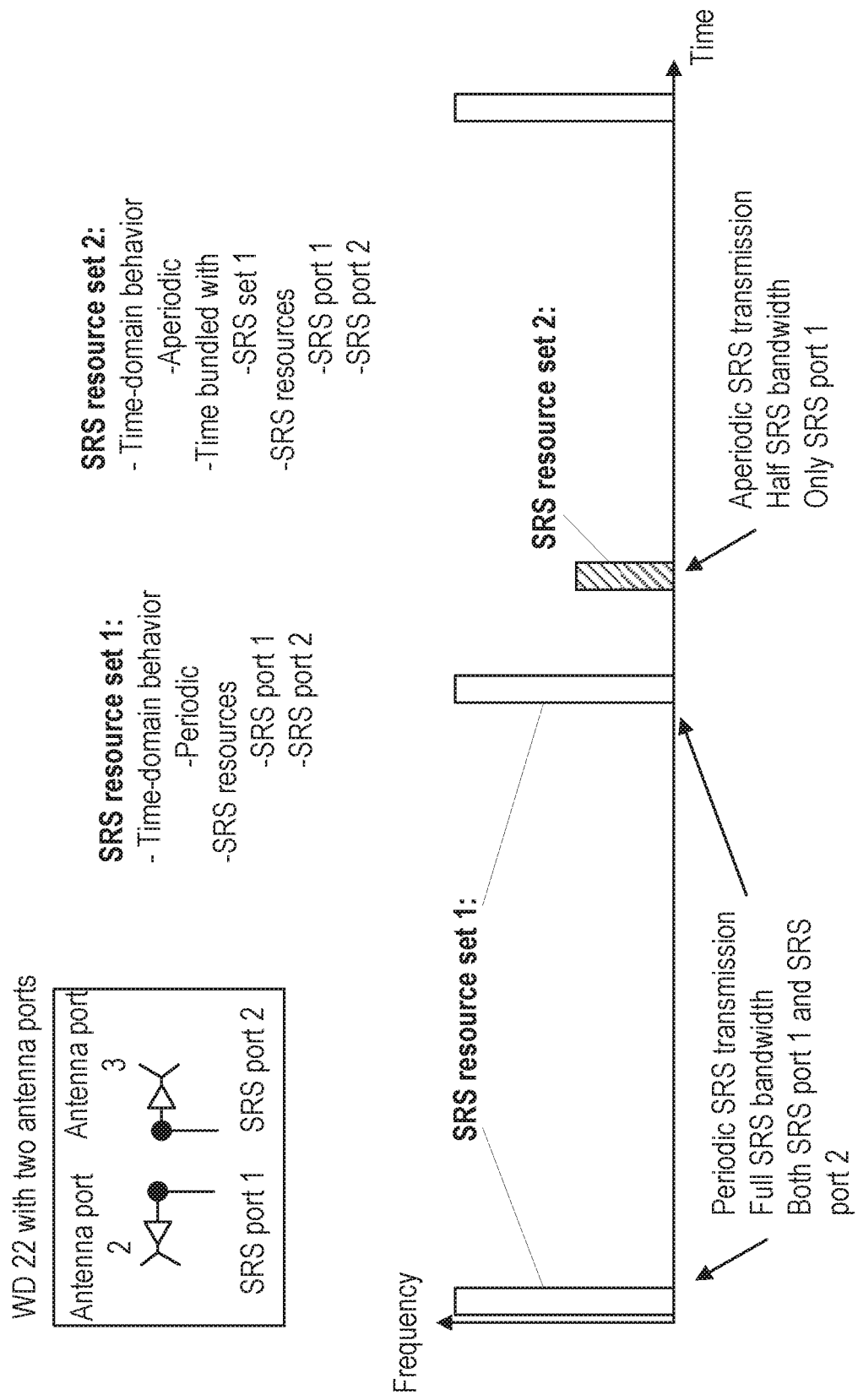
FIG. 18 is a diagram of an SRS resource set configuration according to some embodiments of the present disclosure.

One example of this embodiment is illustrated in FIG. 18. In this example, a wireless device 22 is equipped with two antenna ports. One P SRS resource set (SRS resource set 1) is configured with one SRS resource spanning the full SRS bandwidth and consisting of two SRS ports. A second SRS resource set (SRS resource set 2) is configured with AP time-domain behavior and may be time bundled with SRS resource set 1. Upon receiving and processing of the P SRS transmission, the network node 16 notices that the quality of the channel estimate is poor for SRS port 1 and for the lower half of the SRS frequency band. The network node 16 therefore triggers the AP SRS set to attain improved channel knowledge for SRS port 1 for the lower part of the frequency band. This may be performed by triggering SRS resource set 2 and with an additional bitfield in DCI Format 0_1. The network node 16 indicates which SRS Port/SRS resource and which part of the frequency band the wireless device 22 should sound for the AP SRS set.

In one or more embodiments, instead of configuring an AP SRS resource set with the field timeBundling-r17, as illustrated in FIG. 15, only enabling or disabling of the time bundling feature for an SRS resource set (or SRS resources individually) may be included in the RRC signaling. An extra bitfield in DCI Format 0_1 or a code point in the DCI such as a state in the AP SRS trigger list of states, is used to indicate if SRS time bundling may be applied or not for the upcoming or future or next AP SRS transmission, and if so, which P SRS resource set that the AP SRS resource set(s) may be time bundled with. In a further variant of one or more embodiments, the time bundling may only apply if the distance in time between the AP SRS transmission (or the PDCCH that triggers the AP SRS transmission) and the P SRS transmission is less than a time threshold. Hence, if an AP SRS is triggered, and time bundling may be enabled by RRC signaling, then time bundling may not apply if the time between P and AP SRS transmission exceeds this threshold. The wireless device 22 and network node 16 may, in this case, not obey procedures related to cross-time coherence. This gives some flexibility to use AP SRS without time bundling (i.e., stand-alone AP SRS transmission), which may be useful if, e.g., time bundling impacts power control or spatial relations in an undesired way.

The temporal distance (i.e., the time between P and AP SRS transmissions) can be defined to be measured only from the last P SRS transmission to the AP SRS transmission (hence P SRS may always occur before AP SRS when time bundling applies) or vice versa. The distance can also be measured bidirectionally, which may provide more flexibility to the network node 16 to trigger AP SRS either before or after the P SRS transmission. In addition, the distance can be configured by higher layers, if the channel is believed to be fairly constant over time (as in indoor deployments), a large value of the threshold parameter can be configured (alternatively the threshold parameter may not be configured at all in this case which means AP and P SRS may always be time bundled). Conversely, in case of rapidly time-varying channels, a small threshold parameter can be configured.

Moreover, the threshold can be fixed and/or added in one or more wireless communication standards based on the teaching described herein. In one example, only if the P SRS and a triggered AP SRS are in the same slot, then may time bundling be applied (if enabled by higher-layer signaling), otherwise, the AP SRS and a "nearby" P SRS (i.e., a P SRS within a predefined temporal distance from the AP SRS) have no time-bundling relation.

For example, in one or more embodiments, an extra SRS field in DCI Format 0_1 includes 2 bits as configured by, for example, network node 16. In this case, in one or more embodiments, the codepoint 00 means and/or may indicate that no SRS time bundling is assumed for the AP SR set, the codepoint 01 means and/or may indicate that the AP SRS set may be bundled with P SRS set 1, codepoint 10 means and/or indicates that the AP SRS set may be bundled with P SRS set 2, and codepoint 11 means and/or indicates that the AP SRS set may be bundled with P SRS set 3. These are non-limiting examples of how to map the codepoint in the additional bit field to different SRS time-bundling actions, and/or of many different variants of how the teaches described herein may be performed. One benefit with this embodiment compared to the embodiments described above that uses a field timeBundling-r17 in the RRC configuration, is that it may become more flexible which P SRS set that a wireless device 22 may time bundle with an AP SRS transmission (at the cost of a larger bitfield in the DCI Format 0_1).

In one or more embodiment described herein, SRS time bundling may only be used when the wireless device 22 has the capability cross-time coherency, and that when time bundling is used, the wireless device 22 should maintain the phase of respective SRS ports over the multiple SRS transmissions. However, with a smart receiver (i.e., a receiver having predefined functionality) at the network node 16 time bundling can be useful also when the wireless device 22 may not be able to maintain the phase between different SRS transmissions. Hence, the teachings described herein are not limited to only being applicable when the wireless device 22 is capable of cross-time coherency, and may be applied in cases where cross-time coherency is not used or the quality of cross-time coherency is below a predefined threshold.

Therefore, in one or more embodiments of the instant disclosure, a configuration from the network node 16 is transmitted to the wireless device that allows the network node 16 to perform time bundling across SRS resource set transmissions of different resourceType, where resourceType can be P SRS resource(s)/resource set, SP SRS resource(s)/resource set or AP SRS resource(s)/resource set.

EXAMPLES

Example A1. A network node 16 configured to communicate with a wireless device 22, the network node 16 configured to, and/or comprising a radio interface 62 and/or comprising processing circuitry 68 configured to:
   receive a first aperiodic, AP, reference signal transmission in a first time slot and a second AP reference transmission in a second time slot; and
   perform timing bundling for channel estimation using the first AP reference signal transmission and the second AP reference signal transmission.

Example A2. The network node 16 of Example A1, wherein the processing circuitry 68 is further configured to trigger coherent SRS transmission, at the wireless device 22, using at least one of radio resource control, RRC, signaling and downlink control information, DCI; and
   the time bundling for channel estimation being based on the triggered coherent SRS transmission.

Example A3. The network node 16 of Example A1, wherein the processing circuitry 68 is further configured to use a predefined reference signal-port-to-antenna-port mapping for performing the time bundling.

Example B1. A method implemented in a network node 16 that is configured to communicate with a wireless device 22, the method comprising:
   receiving a first aperiodic. AP, reference signal transmission in a first time slot and a second AP reference transmission in a second time slot; and
   performing timing bundling for channel estimation using the first AP reference signal transmission and the second AP reference signal transmission Example B2. The method of Example B1, further comprising triggering coherent SRS transmission, at the wireless device 22, using at least one of radio resource control, RRC, signaling and downlink control information, DCI; and
   the time bundling for channel estimation being based on the triggered coherent SRS transmission.

Example B3. The method of Example B1, further comprising using a predefined reference signal-port-to-antenna-port mapping for performing the time bundling.

Example C1. A wireless device 22 (WD 22) configured to communicate with a network node 16, the WD 22 configured to, and/or comprising a radio interface 62 and/or processing circuitry 68 configured to:
   transmit a first aperiodic (AP) reference signal transmission in a first time slot and a second AP reference transmission in a second time slot, the first and second AP reference signal transmissions configured to allow for timing bundling for channel estimation.

Example C2. The WD 22 of Example C1, wherein the processing circuitry 68 is further configured to receive at least one indication to trigger coherent SRS transmission, the indication being received via at least one of radio resource control, RRC, signaling and downlink control information, DC; and
   the triggered coherent SRS transmission being configured to allow for the time bundling for channel estimation.

Example C3. The WD 22 of Example C1, wherein the processing circuitry 84 is further configured to use a predefined reference signal-port-to-antenna-port mapping for the first and second AP SRS transmissions; and the predefined reference signal-port-to-antenna-port mapping configured to allow for the time bundling for channel estimation.

Example D1. A method implemented in a wireless device 22 that is configured to communicate with a network node 16, the method comprising transmitting a first aperiodic (AP) reference signal transmission in a first time slot and a second AP reference transmission in a second time slot, the first and second AP reference signal transmissions configured to allow for timing bundling for channel estimation.

Example D2. The method of Example D1, further comprising receiving at least one indication to trigger coherent SRS transmission, the indication being received via at least one of radio resource control, RRC, signaling and downlink control information. DCI; and the triggered coherent SRS transmission being configured to allow for the time bundling for channel estimation.

Example D3. The method of Example D1, further comprising using a predefined reference signal-port-to-antenna-port mapping for the first and second AP SRS transmissions; and the predefined reference signal-port-to-antenna-port mapping configured to allow for the time bundling for channel estimation.

Example AA1. A network node 16 configured to communicate with a wireless device 22, the network node 16 configured to, and/or comprising a radio interface 62 and/or comprising processing circuitry 68 configured to:

receive an indication of wireless device capability for supporting cross-time coherence; and time bundle a first resource type reference signal transmission with a second resource type reference signal transmission based at least on the indication of wireless device capability.

Example AA2. The network node 16 of Example AA1, wherein the first resource type is one of a periodic, P, resource type and semi-persistent, SP, resource type, the second resource type is an aperiodic, AP, resource type.

Example AA3. The network node 16 of Example AA1, wherein the first resource type reference signal transmission uses different SRS ports than the SRS ports used by the second type resource reference signal transmission.

Example AA4. The network node 16 of Example AA1, wherein the SRS port mapping of the SRS ports are one of indicated by the wireless device 22 and predefined by a wireless communication standard.

Example BB1. A method implemented in a network node 16 that is configured to communicate with a wireless device 22, the method comprising:

receiving an indication of wireless device capability for supporting cross-time coherence; and timing bundling a first resource type reference signal transmission with a second resource type reference signal transmission based at least on the indication of wireless device capability.

Example BB2. The method of Example BB1, wherein the first resource type is one of a periodic, P, resource type and semi-persistent, SP, resource type, the second resource type is an aperiodic. AP, resource type.

Example BB3. The method of Example BB1, wherein the first resource type reference signal transmission uses different SRS ports than the SRS ports used by the second type resource reference signal transmission.

Example BB4. The method of Example BB1, wherein the SRS port mapping of the SRS ports are one of indicated by the wireless device 22 and predefined by a wireless communication standard.

Example CC1. A wireless device 22 (WD 22) configured to communicate with a network node, the WD 22 configured to, and/or comprising a radio interface 82 and/or processing circuitry 84 configured to:

transmit an indication of wireless device capability for supporting cross-time coherence; and transmit a first resource type reference signal transmission and a second resource type reference signal transmission in accordance with the cross-time coherence of the wireless device capability.

Example CC2. The WD 22 of Example CC1, wherein the first resource type is one of a periodic, P, resource type and semi-persistent, SP, resource type, the second resource type is an aperiodic, AP, resource type.

Example CC3. The WD of Example CC1, wherein the first resource type reference signal transmission uses different SRS ports than the SRS ports used by the second type resource reference signal transmission.

Example CC4. The WD 22 of Example CC1, wherein the SRS port mapping of the SRS ports are one of indicated to the network node 16 and predefined by a wireless communication standard.

Example DD1. A method implemented in a wireless device 22 (WD 22) that is configured to communicate with a network node 16, the method comprising:

transmitting an indication of wireless device capability for supporting cross-time coherence; and transmitting a first resource type reference signal transmission and a second resource type reference signal transmission in accordance with the cross-time coherence of the wireless device capability Example DD2. The method of Example DD1, wherein the first resource type is one of a periodic, P, resource type and semi-persistent, SP, resource type, the second resource type is an aperiodic, AP, resource type.

Example DD3. The method of Example DD1, wherein the first resource type reference signal transmission uses different SRS ports than the SRS ports used by the second type resource reference signal transmission.

Example DD4. The method of Example DD1, wherein the SRS port mapping of the SRS ports are one of indicated to the network node 16 and predefined by a wireless communication standard.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
AP Aperiodic
ASN Abstract Syntax Notation
BB Baseband
CE Control Element
CSI Channel State Information
CSI-RS Channel State Information Reference Signal
DCI Downlink Control Information
DL Downlink
DM-RS Demodulation Reference Signal
FR2 Frequency Range 2
gNB gNodeB
IE Information Element
LTE Long Term Evolution
MAC Medium Access Control
MIMO Multiple-Input Multiple-Output
MCS Modulation and Coding Scheme
NR New Radio
OFDM Orthogonal Frequency-Division Multiplexing
P Periodic
PC Power Control
PDCCH Physical Downlink Control Channel
PDSCH Physical Downlink Shared Channel
PSD Power Spectral Density
RAN4 Radio Access Network Work Group 4
RB Resource Block
RRC Radio Resource Control
RS Reference Signal
RSRP Reference Signal Received Power
SNR Signal-to-Noise Ratio
SP Semi-Persistent
SRS Sounding Reference Signal
SSB Synchronization Signal Block
UE User Equipment
UL Uplink It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device, the network node comprising:
processing circuitry configured to:
receive an indication of a wireless device capability to maintain phase coherence within a predefined tolerance for reference signals transmitted by the wireless device in different time slots;
receive a first reference signal transmission in a first time slot and a second reference signal transmission in a second time slot, the first reference signal transmission being an aperiodic, AP, reference signal transmission; and
perform channel estimation at least in part by combining the first reference signal transmission and the second reference signal transmission, the first reference signal transmission and the second reference signal transmission having cross-time coherence, the performing the channel estimation being based on time-bundling the first reference signal transmission and the second reference signal transmission, the combining being performed based on the indication indicating that the wireless device is capable of maintaining the phase coherence within the predefined tolerance for the reference signals transmitted by the wireless device in the different time slots.

2. The network node of claim 1, wherein the second reference signal transmission is one of:
an AP reference signal transmission;
a periodic reference signal transmission; and
a semi-persistent reference signal transmission.

3. The network node of claim 1, wherein the processing circuitry is further configured to:
determine whether at least one of a physical shared channel transmission and physical control channel transmission occurred during a time duration between the first reference signal transmission and the second reference signal transmission,
wherein the combining of the first reference signal transmission and the second reference signal transmission is based at least on the determination that the physical shared channel transmission and physical control channel transmission did not occur during the time duration.

4. The network node of claim 1, wherein the processing circuitry is further configured to:
determine a first spatial relation of a first reference signal resource set associated with the first reference signal transmission;
determine a second spatial relation of a second reference signal resource set associated with the second reference signal transmission; and
determine whether the first spatial relation is the same as the second spatial relation,
wherein the combining of the first reference signal transmission and the second reference signal transmission is based at least on the determination that the first spatial relation is the same as the second spatial relation.

5. The network node of claim 1, wherein the first reference signal transmission and the second reference signal transmission are associated with a same sounding reference signal, SRS, trigger state.

6. The network node of claim 1, wherein the second reference signal transmission is one of a periodic reference signal transmission and a semi-persistent reference signal transmission.

7. The network node of claim 1, wherein the processing circuitry is further configured to:
determine whether a time separation between the first reference signal transmission and the second reference signal transmission meets a predefined time duration threshold,
wherein the combining of the first reference signal transmission and the second reference signal transmission is based at least on the determined time separation not meeting the predefined time duration threshold.

8. The network node of claim 1, wherein the processing circuitry is further configured to cause transmission of an indication that indicates for the wireless device to use a cross-time coherence operation to maintain phase coherence within the predefined tolerance for reference signals transmitted in different time slots.

9. The network node of claim 8, wherein the indication is provided using one of downlink control information, DCI, signaling and radio resource control, RRC, signaling.

10. The network node of claim 9, wherein a DCI format of the DCI indicates SRS resources and a portion of a frequency band for transmitting the first reference signal transmission.

11. A wireless device configured to communicate with a network node, the wireless device comprising:
processing circuitry configured to:
cause transmission of an indication of a capability to maintain phase coherence within a predefined tolerance for reference signals transmitted by the wireless device in different time slots; and
cause transmission of a first reference signal transmission in a first time slot and a second reference signal transmission in a second time slot, the first reference signal transmission being an aperiodic, AP, reference signal transmission and having a phase coherence within the predefined tolerance of the second reference signal transmission for channel estimation at least in part by combining the first reference signal transmission and the second reference signal transmission, the first reference signal transmission and the second reference signal transmission having cross-time coherence, the channel estimation being based on time-bundling the first reference signal transmission and the second reference signal transmission, the combining being performed based on the indication of the capability to maintain the phase coherence within the predefined tolerance for the reference signals transmitted by the wireless device in the different time slots.

12. The wireless device of claim 11, wherein the second reference signal transmission is one of:
an AP reference signal transmission;
a periodic reference signal transmission; and
a semi-persistent reference signal transmission.

13. The wireless device of claim 11, wherein the combining of the first reference signal transmission and the second reference signal transmission is based at least on a physical shared channel transmission and physical control channel transmission not occurring during a time duration between the first reference signal transmission and the second reference signal transmission.

14. The wireless device of claim 11, wherein the combining of the first reference signal transmission and the second reference signal transmission is based at least on a first spatial relation of the first reference signal transmission having a same spatial relation as a second spatial relation of the second reference signal transmission.

15. A method implemented by a network node that is configured to communicate with a wireless device, the method comprising:
receiving an indication of a wireless device capability to maintain phase coherence within a predefined tolerance for reference signals transmitted by the wireless device in different time slots;
receiving a first reference signal transmission in a first time slot and a second reference signal transmission in a second time slot, the first reference signal transmission being an aperiodic, AP, reference signal transmission; and
performing channel estimation at least in part by combining the first reference signal transmission and the second reference signal transmission, the first reference signal transmission and the second reference signal transmission having cross-time coherence, the performing the channel estimation being based on time-bundling the first reference signal transmission and the second reference signal transmission, the combining being performed based on the indication indicating that the wireless device is capable of maintaining the phase coherence within the predefined tolerance for the reference signals transmitted by the wireless device in the different time slots.

16. The method of claim 15, wherein the second reference signal transmission is one of:
an AP reference signal transmission;
a periodic reference signal transmission; and
a semi-persistent reference signal transmission.

17. The method of claim 15, further comprising determining whether at least one of a physical shared channel transmission and physical control channel transmission occurred during a time duration between the first reference signal transmission and the second reference signal transmission,
wherein the combining of the first reference signal transmission and the second reference signal transmission is based at least on the determination that the physical shared channel transmission and physical control channel transmission did not occur during the time duration.

18. The method of claim 15, further comprising:
determining a first spatial relation of a first reference signal resource set associated with the first reference signal transmission;
determining a second spatial relation of a second reference signal resource set associated with the second reference signal transmission; and
determining whether the first spatial relation is the same as the second spatial relation,
wherein the combining of the first reference signal transmission and the second reference signal transmission is based at least on the determination that the first spatial relation is the same as the second spatial relation.

19. The method of claim 15, further comprising determining whether a time separation between the first reference signal transmission and the second reference signal transmission meets a predefined time duration threshold,
wherein the combining of the first reference signal transmission and the second reference signal transmission is based at least on the determined time separation not meeting the predefined time duration threshold.

20. The method of claim 15, further comprising causing transmission of an indication that indicates for the wireless device to use a cross-time coherence operation to maintain phase coherence within the predefined tolerance for reference signals transmitted in different time slots.

* * * * *